(12) United States Patent
Pedersen et al.

(10) Patent No.: US 9,239,630 B2
(45) Date of Patent: *Jan. 19, 2016

(54) INPUT DEVICE WITH A DISPLAY CONFIGURED FOR DYNAMIC DISPLAY OF KEY LABELS

(75) Inventors: Finn Pedersen, Roskilde (DK); Jesper Glückstad, Frederiksberg (DK)

(73) Assignee: DANMARKS TEKNISKE UNIVERSITET, Kgs. Lyngby (DK)

( * ) Notice: Subject to any disclaimer, the term of this patent is extended or adjusted under 35 U.S.C. 154(b) by 0 days.

This patent is subject to a terminal disclaimer.

(21) Appl. No.: 14/129,019

(22) PCT Filed: Jun. 25, 2012

(86) PCT No.: PCT/DK2012/000075
§ 371 (c)(1),
(2), (4) Date: May 23, 2014

(87) PCT Pub. No.: WO2012/175086
PCT Pub. Date: Dec. 27, 2012

(65) Prior Publication Data
US 2014/0247219 A1 Sep. 4, 2014

Related U.S. Application Data

(60) Provisional application No. 61/568,234, filed on Dec. 8, 2011.

(30) Foreign Application Priority Data

Jun. 24, 2011 (DK) .................................. 2011 00476
Dec. 8, 2011 (EP) ..................................... 11192573

(51) Int. Cl.
*G09G 5/00* (2006.01)
*G06F 3/023* (2006.01)
*G06F 3/02* (2006.01)

(52) U.S. Cl.
CPC ............ *G06F 3/0233* (2013.01); *G06F 3/0202* (2013.01); *G06F 3/0238* (2013.01)

(58) Field of Classification Search
CPC ... G06F 3/0202; G06F 3/0219; G06F 3/0233; G06F 3/0238
USPC ...................................... 345/156, 168; 341/22
See application file for complete search history.

(56) References Cited

U.S. PATENT DOCUMENTS 4,274,093 A * 6/1981 Judge ............................ 345/174
5,515,045 A 5/1996 Tak
(Continued)

FOREIGN PATENT DOCUMENTS

| EP | 226392 A2 | 6/1987 |
| EP | 410640 A2 | 1/1991 |
| GB | 2181283 A | 4/1987 |

(Continued)

OTHER PUBLICATIONS

International Search Report and Written Opinion for PCT:DK2012:000075, mailed Oct. 10, 2012.
Supplemental Written Opinion for PCT:DK2012:000075, mailed Jun. 13, 2013.

*Primary Examiner* — Jennifer Nguyen
(74) *Attorney, Agent, or Firm* — Brinks Gilson & Lione

(57) ABSTRACT

According to the present invention there is provided an input device (100) comprising a plurality of keys, at least one detection structure (107), and at least one display (104), wherein: each of the plurality of keys have a depressible key cap (101) with an at least semi-transparent top surface, the at least one detection structure is configured for detecting individual depression of each of the plurality of key caps, and the at least one display (104) is configured for providing image information of individual labels (103) for each key of the plurality of keys. Furthermore, the at least one display is arranged between the at least one detection structure (107) and the plurality of key caps, such that the individual labels (103) of the plurality of keys are viewable via the transparent top surfaces of the respective key caps.

20 Claims, 14 Drawing Sheets

(56) References Cited

U.S. PATENT DOCUMENTS

| | | | |
|---|---|---|---|
| 5,634,080 A | 5/1997 | Kikinis | |
| 6,028,591 A * | 2/2000 | Lueders | 345/156 |
| 2008/0164132 A1* | 7/2008 | Yoo et al. | 200/5 A |
| 2009/0153491 A1 | 6/2009 | Moosavi | |
| 2011/0268487 A1 | 11/2011 | Larsen | |
| 2014/0300550 A1* | 10/2014 | Pedersen et al. | 345/168 |

FOREIGN PATENT DOCUMENTS

| | | |
|---|---|---|
| JP | 2005352987 A | 12/2005 |
| WO | 2008082090 A1 | 7/2008 |

OTHER PUBLICATIONS

International Preliminary Report on Patentability for PCT:DK2012:000075, completed Sep. 17, 2013.

* cited by examiner

INPUT DEVICE WITH A DISPLAY CONFIGURED FOR DYNAMIC DISPLAY OF KEY LABELS

RELATED APPLICATIONS

This application claims the benefit under 35 U.S.C. §371 of International Patent Application No PCT/DK2012/000075, having an international filing date of Jun. 25, 2012, which claims priority to European Application No. 11192573.1, filed on Dec. 8, 2011, U.S. Application 61/568,234, filed on Dec. 8, 2011, and Danish Application No. PA201100476, filed Jun. 24, 2011, the contents of all of which are incorporated herein by reference in their entirety.

The present invention relates to an input device having a plurality of keys, where the input device is configured for displaying dynamic key labels, i.e. labels that may be modified/changed e.g. during operation of the input device. More specifically the present invention relates to a keyboard e.g. for use with a computer, an electronic game, a musical instrument, a money dispenser, a sales terminal, or another terminal, etc., having labels on the keys that can be changed during operation of the keyboard, e.g. in order to display symbols or icons in the labels that indicate the current functions of the respective keys of the keyboard.

Almost everything relating to today's personal computers are subject to ongoing significant developments. The ongoing development of processor power, the flat screens, and wireless interfaces are evident examples of this development. However, the computer keyboard seems to constitute an exception. The keyboard design has remained largely unchanged since the invention of the typewriter although a few differences from one language to another and a few functional keys arranged in proprietary layouts have been introduced.

Typically, a keyboard for a computer or the like has keys labeled with characters of the English written language. The labels are printed or molded in a predetermined arrangement in the following denoted the keyboard layout. Some European countries have a greater range of characters and vowels than the English language so that keyboards in some countries have some keys with different key positions.

A keyboard is known from WO 2008/065195.

Thus, there is a need for improvement in an input device such as the known keyboards.

According to a first aspect of the present invention there is provided an input device comprising: a plurality of keys, at least one detection structure, and at least one display.

The plurality of keys may comprise a first plurality of keys and may include a first key, a second key, and a third key. Each of the plurality of keys may have a depressible key cap with an at least semi-transparent top surface. Each of the plurality of keys may further have at least one communication member configured for communicating a depression of the corresponding key cap. The at least one detection structure may be configured for detecting individual depression of each of the plurality of key caps as communicated by at least one respective communication member of any of the plurality of keys. The at least one display may comprise a first display that may form a first sheet. The first display may be configured for providing image information of individual labels for each key of the first plurality of keys. The first display may be arranged between the at least one detection structure and the key caps of the first plurality of keys, such that the individual labels of the first plurality of keys are viewable via the at least semi-transparent top surfaces of the respective key caps. The first display may comprise a plurality of first channels and a plurality of second channels. The plurality of first channels may intersect the plurality of second channels. The first display may be configured such that a pixel of the first display is provided with respective image information by addressing both a respective channel of the plurality of first channels and a respective channel of the plurality of second channels. At least one channel of the plurality of first channels may be configured for addressing a first pixel of a first label of the first key and a second pixel of a second label of the second key. At least one channel of the plurality of second channels may be configured for addressing the first pixel of the first label of the first key and a third pixel of a third label of the third key. The first display may comprise a plurality of through holes. The plurality of through holes may enable the plurality of respective communication members to communicate physically there through to the at least one detection structure for detecting individual depression of each of the first plurality of key caps.

According to a second aspect of the present invention there is provided an input device comprising: a plurality of keys, at least one detection structure, and at least one display. The plurality of keys may comprise a first group of keys. Each of the plurality of keys has a depressible key cap with a top surface that may be at least semi-transparent. Each of the plurality of keys further has at least one communication member configured for communicating a depression of the corresponding key cap. The at least one detection structure is configured for detecting individual depression of each of the plurality of key caps, i.e. e.g. as communicated by at least one respective communication member, e.g. least one respective communication member of any of the plurality of keys. The at least one display may comprise a first display that may form a first sheet. The at least one display is configured for providing image information of individual labels for each key of the plurality of keys. The at least one display is arranged between the at least one detection structure and the plurality of key caps, such that the individual labels of the plurality of keys are viewable via the transparent top surfaces of the respective key caps.

According to a third aspect of the present invention there is provided a keyboard comprising a plurality of keys, at least one detection structure, and a display for displaying individual labels of the plurality of keys. Each of the plurality of keys has a key cap with a transparent top surface. The key cap is depressible. Each of the plurality of keys has at least one communication member configured for communicating a depression of the corresponding key cap to the detection structure. The at least one detection structure is configured for detecting individual depression of each of the plurality of key caps as communicated by at least one respective communication member. The display is configured for displaying individual labels of the plurality of keys. The display is arranged between the detection structure and the plurality of key caps. Thus, the individual labels of the plurality of keys are viewable through the transparent top surfaces of the respective key caps. The display comprises a plurality of through holes. The plurality of through holes enables the plurality of communication members to communicate to the at least one detection part through the plurality of through holes. The communication enables detection of individual depression of each of the plurality of key caps.

It is a possible advantage of the present invention that the at least one detection structure does not interfere with the display of labels of keys (i.e. key labels). It is a possible advantage of the present invention that the key caps may be situated close to the at least one display, thus enabling an improved display of key labels. It is a possible advantage of the present invention the keys may be configured for a desired tactile feedback while not disturbing the display of key labels. It is a possible advantage of the present invention that standard products and/or simple production steps may be utilized for the device, which enables a cost-effective production.

BRIEF DESCRIPTION OF THE DRAWINGS

The above and other features and advantages of the present invention will become readily apparent to those skilled in the art by the following more detailed description of the invention including reference to exemplary embodiments thereof and with possible references to the attached drawings.

Figure 1:
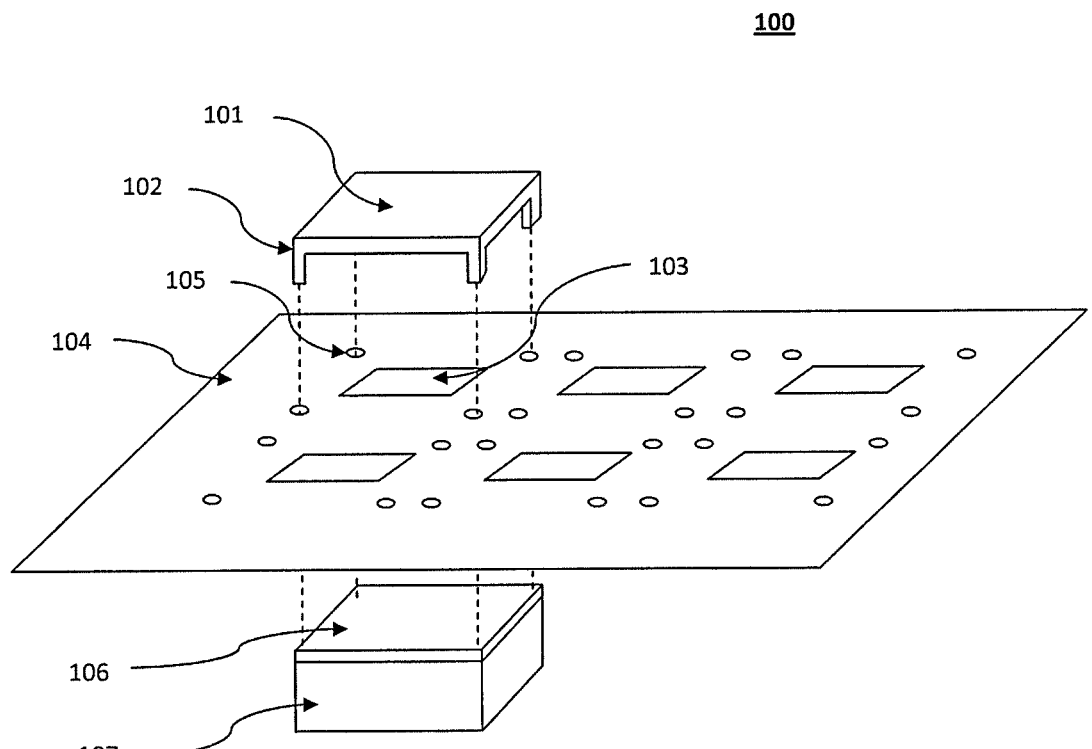
FIG. 1 illustrates schematically an exploded view of a keyboard according to the present invention.

The figures are schematic and simplified for clarity, and they may merely show details which are essential to the understanding of the invention, while other details may have been left out.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and sufficient, and will fully convey the concept of the invention to those skilled in the art. Like reference numerals refer to like elements throughout.

DETAILED DESCRIPTION

The input device according to the present invention may comprise a frame and/or housing, e.g. such as is known for keyboards according to the prior art. The frame/housing may include a top cover. The possible frame/housing of the present invention may (e.g. in combination with the plurality of key caps) enclose (or substantially enclose) the at least one display and the at least one detection structure. The possible frame/housing of the present invention may facilitate and/or provide a fixed mutual position of the at least one display and the at least one detection structure.

Each or any key of the plurality of keys may comprise at least one guide member configured for guiding a depression of the key cap of the respective key. The at least one guide member may include the at least one communication member of the corresponding key. Any communication member may also be or comprise a guide member. Any guide member may not necessarily be or comprise a communication member. A guide member and a communication member may appear similar in structure and may be identical in structure at least for the parts thereof that are on the same side at least one display as the key cap.

The at least one guide member for each of the plurality of keys may comprise at least two guide members, such as at least three guide members, such as at least four guide members. The at least one communication member for each of the plurality of keys may comprise at least two communication members, such as at least three communication members, such as at least four communication members. A plurality of guide members and/or communication members may facilitate stability of the movement/displacement of the corresponding key cap during depression thereof. A plurality of communication members may facilitate the communication of a depression. This may furthermore facilitate tactile feedback during use of the input device.

The key caps may be configured for a depression in relation to the at least one detection structure and/or in relation to the at least one display. The key caps may be configured for being linearly depressible towards the at least one detection structure and/or towards the at least one display. This may facilitate tactile feedback during use of the input device.

A label for a key may be denoted a key label. A label for a key may be similar or identical to a tag for a key.

According to the present invention, a sheet may be defined as a relative flat structure, such as having a length along one dimension (e.g. a depth) that is smaller than e.g. about 5 and/or 10 times the length along one or more perpendicular dimensions (e.g. a width and/or breadth). This may enable a more compact and/or more lightweight input device.

The at least one display may be flexible/bendable or may comprise one or more flexible/bendable parts. However, the input device may be configured such that the at least one display (or any parts thereof) is not bent back and forth during use of the input device.

The at least one display may comprise a second display that may form a second sheet. This may provide a more versatile input device and may enable improved design flexibility. The plurality of keys may comprise a second group of keys.

The first display may be configured for providing image information of individual labels for each key of the first group of keys. The first display may be arranged between the at least one detection structure and the plurality of key caps of the first group of keys, such that individual labels of the first group of keys are viewable via the transparent top surfaces of the respective key caps.

The second display may be configured for providing image information of individual labels for each key of the second group of keys. The second display may be arranged between the at least one detection structure and the plurality of key caps of the second group of keys, such that individual labels of the second group of keys are viewable via the transparent top surfaces of the respective key caps.

The first display (and/or any further displays of the at least one display, such as the second display) has a first extension and a second extension. The first extension may be defined along a first side of the display. The second extension may be defined along a second side of the display. The first and the second side of the display may be adjacent. The first extension and the second extension may be defined perpendicularly to each other. The first extension and the second extension may each be defined within the plane of the display, e.g. perpendicular to a normal of the display surface.

The first display (and/or the second display) may be a rectangular or substantially rectangular sheet having a first side and an adjacent second side, where the display has the first extension along the first side and the second extension along the second side. This may enable use of standard parts for the present invention and may therefore be cost-effective.

The first display (and/or the second display) may have a first extension that is larger than a combined extension of two adjacent key caps of the keys of the first group of keys, e.g. measured along the same axis of the input device when the input device is assembled. The first extension may be larger than or equal to a combined extension of all the key caps of the keys of the first group of keys. This may improve simplicity and cost-effectiveness.

The first display (and/or the second display) may have a second extension that is smaller than a first distance between two guide members and/or two communication members of a key e.g. of the first group of keys. This may improve production simplicity and cost-effectiveness since e.g. no through holes may be needed.

The first display (and/or the second display and/or any further display of the at least one display) may have a depth of about 0.05 mm to about 3 mm, such as from about 0.1 mm to about 2 mm, such as about 0.3 mm. The first display (and/or the second display and/or any further display of the at least one display) may have a first extension of about 15 cm to about 75 cm, such as from about 30 cm to about 45 cm. The first extension may depend upon the extension of the plurality of keys in the same direction, i.e. e.g. the first direction. The first display (and/or the second display and/or any further display of the at least one display) may have a second extension of about 5 mm to about 15 cm, such as from about 12 cm to about 13 cm. The second extension may depend upon the extension of the plurality of keys in the same direction, i.e. e.g. the second direction, e.g. divided by the number of displays comprised by the at least one display.

The at least one display may be configured for multiplex (and/or matrix) addressing of pixels, such as known in the art of displays, where pixels are addressed by a plurality of intersecting channels (e.g. denoted activation channels), such as electrodes. The display may comprise a plurality of first channels and a plurality of second channels. The plurality of first channels may be mutually parallel. The plurality of second channels may be mutually parallel. Each channel of the plurality of first channels may intersect each channel of the plurality of second channels and vice versa. Thus, the channels may define rows and columns, e.g. perpendicular rows and columns. Thus, a pixel may be activated when two channels (e.g. a first channel and a second channel), which intersect each other at that particular pixel, are activated simultaneously. The activation of a pixel may be via an individual switch for each pixel, such as known for an active matrix addressing scheme. Alternatively, passive matrix addressing (where a switch-component may not be applied) may be utilized.

The input device may comprise a plurality of display interfaces configured to feed the at least one display (by means of the channels) with data for provision of the image information. The plurality of display interfaces may include a first display interface e.g. for feeding the plurality of first channels and a second display interface e.g. for feeding the plurality of second channels. The first display interface and the second display interface may be perpendicular to each other. The first display interface and the second display interface may be configured to feed a plurality of mutually intersecting channels. The plurality of display interfaces may include a third display interface. The third display interface may be configured to feed the at least one display from an opposing direction compared to the first display interface. The third display may be configured to feed the plurality of first channels. Alternatively or additionally, the third display may be configured to feed a plurality of third channels, which may be perpendicular to the plurality of first channels. The plurality of display interfaces may include a fourth display interface. The plurality of display interfaces may be configured to feed the at least one display from at least three different angles, such as from two opposing directions and a perpendicular direction thereto.

For display interfaces at opposing sides of a display, where a plurality of first channels extends between the opposing display interfaces, one display interface may be connected to some channels of plurality of first channels, while the other display interface may be connected to other channels of the plurality of first channels, such as each being connected to every second channel of the plurality of first channels. This may enable a simple activation strategy for the activation of channels by a display interface. Alternatively, both display interfaces are configured to be connected to each channel of the display along one direction. This may enable that through holes, as explained below, may lead to less deactivation/disturbance of areas of the display, see further below.

The first display interface and the second display interface may be configured to feed the first display. The third display interface may be configured to feed the first display. Alternatively or additionally, the third display interface and the fourth display interface may be configured to feed the second display.

The at least one display may comprise a plurality of through holes. The plurality of through holes may enable the plurality of communication members to communicate there through (i.e. e.g. physically there through) to the at least one detection part for detecting individual depression of each of the plurality of key caps. The plurality of through holes may enable the plurality of guide members and/or communication members to be moveable there through. It is an advantage that a plurality of through holes may enable a desirable movement/displacement of the key caps while providing a reduced disturbance of view of the label provided by the at least one display via the key cap, since the at least one detection structure is situated at the opposite side of the at least one display than the key cap.

A through hole may reduce the capability of the at least one display to provide image information since one or more channels of the display may be blocked by a through hole. Thus, a through hole may prevent activation by a display interface of the part of a channel running from the display interface, which part is not between the respective through hole and the respective display interface, i.e. on the far side of the through hole compared to the respective display interface. Thus, any pixels situated at this far side may be prevented from being activated—at least by that particular display interface. However, that part of the channel that is prevented from being activated by the respective display interface, or at least a part of that part, may, in one or more embodiments, be activated by another display interface e.g. situated at the opposite side of the through hole.

The plurality of through holes may be aligned according to a desired mutual placement of the plurality of keys/key caps.

The plurality of through holes may be configured in a rectangular array-like placement, such as in a matrix-like structure. This may enable one or more of the following advantages: a relative simple production of a display; relative simple interface/connectivity requirements; that relative large areas of the display are suitable for provision of image information. However, the plurality of through holes may be displaced in comparison with such a rectangular array-like placement, e.g. by being displaced along the first extension of the display while maintaining the alignment along the second extension. Thus, the plurality of through holes may be aligned according to a desired layout, such as known from the placement of at least some of the keys in a computer keyboard.

The at least one display may define a plurality of corridors, such as a narrow strip that may comprise a number of channels running from a display interface thereof. Narrow may in this context mean a width corresponding to the width of a through hole or within 1 to 5 times the width of a through hole, such as about 3 times the width of a through hole. The plurality of through holes, or at last some of the plurality of through holes, may be situated within the plurality of corridors running from a display interface, wherein each corridor of the plurality of corridor holds a plurality of through holes of the plurality of through holes. Hereby the area of the at least one display that is influenced (i.e. e.g. made inactive) by the plurality of through holes may be reduced to the defined corridors.

At least a part of each communication member may be moveable within at least one of the plurality of through holes, i.e. e.g. movable along the axis of the opening of the respective through hole.

The plurality of through holes may comprise a through hole for each of the plurality of communication members and/or guide members. This may reduce the needed dimension of a through hole and this may reduce the impact on the capability of the at least one display to provide image information as caused by deactivation of channels by through holes.

The plurality of through holes may comprise fewer through holes than the number of communication members and/or guide members. This may simplify production of the at least one display.

The input device may be configured such that a first plurality of communication members and/or guide members may communicate in parallel through a first shared through hole. The first plurality of communication members and/or guide members may comprise communication members and/or guide members of different keys.

The input device may be configured such that each communication member and/or guide member of any specific key is configured for communicating/being movable through individual through holes. This may imply that no through hole spans between communication members and/or guide members of a respective key and thus does not impact correspondingly on the possibility of the at least one display to provide image information.

Each communication member and/or each guide member may comprise a rigid (or substantially rigid) member being rigidly connected to the corresponding key cap. Such a rigid member may be denoted a leg of a key. A rigid member may be or form a rod-like structure, which may be connected to a key cap at an edge and/or corner thereof. Alternatively, a rigid member may form a plate-like structure, which may be connected to a key cap at an edge and/or side thereof.

The at least one detection structure may comprise a plurality of detection parts, e.g. including a detection part for each of the plurality of keys. The at least one detection structure may include a key switch for each key of the input device. Alternatively, or in combination, the at least one detection structure may comprise a sheets (e.g. of plastic) with a plurality of contacts thereon, such as a contact for each key of the input device.

The at least one display may comprise an OLED display (such as an active-matrix organic light-emitting diode (AMOLED) display), an electrophoretic display, an electrowetting display, or a polymer LCD. An OLED display may in particular be advantageous for a compact structure of the input device.

The at least one display may be configured for displaying the individual labels of the plurality of keys. The at least semi-transparent top surface of each key cap of the plurality of keys may be a transparent top surface. The individual labels of the plurality of keys may be viewable through the transparent top surfaces of the respective key caps. Thus, "viewable via" may be understood as "viewable through".

The at least semi-transparent top surface of each of the key caps of the plurality of keys may comprise a diffuse transmissive part. The input device may be configured for projecting the image information of the individual labels from the at least one display onto the respective diffuse transmissive parts, such that the individual labels of the plurality of keys are viewable at the respective key caps. The projecting of image information may be facilitated by means of one or more optical devices such as an optical device for each key. The optical device may comprise a lens.

The first display (and/or any further display of the at least one display) may form a substantially planar sheet.

The input device may be a keyboard, such as a computer keyboard, i.e. a keyboard configured for use with a computer.

The present invention may include a device, such as a mobile communication device or an electronic instrument, with an input device according to the present invention.

The present invention may include an apparatus with a processor that may be connected to an input device according to the present invention or another device according to the present invention, wherein the processor may be configured for receiving input from the input device and may be configured for controlling the at least one display for provision of the individual labels of the plurality of keys e.g. in response to e.g. user input.

The processor may be configured to execute an editor and/or to allow the user to define or chose a layout of the individual labels of the plurality of keys.

A keyboard may be an input or input/output device comprising a number of keys that may be activated by depression, e.g. by use of one or more fingers of a user. An input device according to the present invention may include an output device.

The keyboard and/or input device may be configured such that a depression of a key may result in a translatory motion of between 0.5 and 3 mm, such as between 1 and 2 mm.

The keys may be configured for being depressed along individual fixed axes. This may be enabled by provision of one or more guides and/or guide members and/or scissor switches for each of the keys. The individual fixed axes may be parallel to each other.

The key caps of the keys may be defined as the part of the keys that may be touched by a user during use.

The key caps and/or the top surfaces of the key caps may be transparent (or at least substantially transparent, or at least semitransparent) to electromagnetic radiation within the visible wavelength range or at least parts thereof.

Furthermore, the key caps may be made of a transparent material, such as a transparent plastic material. Furthermore, the communication members may be made of a transparent material, such as a transparent plastic material.

The top surface of a key cap may be the surface that normally will face upwards when the keyboard/input device is placed on a horizontal surface in a position that is intended for use of the keyboard/input device. Alternatively, or additionally the top surface of a key cap may be defined as the surface that is intended to be touched and activated by a user.

A communication member may be any object or element or assembly that may communicate a motion (a depression) from the key cap and to the detection structure.

The detection structure may be any structure that is configured for detection the motion of the communication member.

The through holes of the display (or the at least one display) may be cutouts (e.g. such as by a process of stamping out the holes of the display) or the display may be manufactured directly with such missing parts of the display. This has an advantage that a standard display may be utilized for the present invention, thus it may improve cost-effectiveness.

A through hole of the display may enable a communication member to be displaced within the through hole, e.g. in the same direction as the displacement of a key cap during depression thereof.

Thus, a communication member may for instance be physically connected or connectable with the detection structure, such that the key caps are connected or connectable with the detection structure by means of the communication members through the through holes.

Each communication member may comprise a substantially rigid part being rigidly connected to the transparent top surface of the corresponding key cap.

At least a part of each communication member may be displaceable within at least one of the plurality of through holes.

The at least one communication member for each of the plurality of keys may comprise at least two communication members, such as at least three communication members, such as at least four communication members. This may improve stability of motion during depression of a key cap.

The plurality of through holes may comprise a through hole for each of the plurality of communication members.

The at least one detection structure may comprise a plurality of detection parts including one detection part for each of the plurality of keys. A detection part may for instance be a key switch.

The display may for instance be (or include) an OLED (organic light emitting diode) display, an electrophoretic display, an electro-wetting display, or a polymer LCD display.

A device, such as a mobile communication device or an electronic instrument or any electronic device, may comprise a keyboard/input device according to the present invention.

An apparatus with a processor that may be connected to a keyboard/input device according to the present invention, and that may be adapted to receive inputs from the keyboard/input device and to control the display for displaying the individual labels of the plurality of keys in response to a user input may form part of an embodiment according to the present invention.

The processor may be adapted to execute an editor and to allow the user to define the layout of the individual labels of the plurality of keys.

The keyboard/input device according to the present invention may form part of a keyboard comprising additional keys.

It is an advantage of the present invention that the keyboard/input device may be operated by a user in the same way as a conventional keyboard. For example, a specific type of tactile feedback experienced by the user during use of a particular conventional keyboard may also be provided by a keyboard/input device according to the present invention. The tactile feedback relates to how it feels to depress a key of the keyboard/input device, for example whether a "click" is generated by a key when depressed by the user and how the "click" feels and sounds. Tactile feedback may also relate to the size of the linear displacement of the key when depressed by the user, etc.

Further, the various key layouts provided by conventional keyboards may also be provided by the keyboard/input device according to the present invention, for example the user may select a specific keyboard layout by activating respective specific keys of the keyboard/input device either simultaneously and/or in a specific sequence.

In accordance with the invention, the keyboard/input device may be provided with a display for displaying the keyboard labels/key labels viewable from the top surface of the keys thereby replacing the conventionally fixed key labels with labels that can be changed during operation of the keyboard/input device e.g. by appropriate control of the keyboard/input device.

The display may have the conventional display capabilities known from conventional, organic light emitting diode displays, liquid crystal displays, light emitting diode displays, or plasma displays, e.g. such as used in television or computer flat screens, making it possible to display almost anything that is viewable from the top of each key (key cap) of the keyboard/input device and to change whatever is currently displayed in the key label to something else during operation of the keyboard/input device. In this way, key labels may also be animated according to the present invention.

The displayed label of a key may indicate the current function of the key. For example when the keyboard/input device is used as a typewriter keyboard, the display (that may be flexible) may display a conventional layout of lower case letters, numbers and other characters used in writing in the country in question. When depressing the "shift"-key, the display changes the labels into upper case letters, numbers, etc, and when depressing the "AltGr"-key, the display changes the labels accordingly. Thus, the user is relieved from the task of remembering which keys to depress in order to type specific graphical symbols. Likewise, when the keyboard/input device is used together with a computer with a word processor utilizing various function keys, the keyboard/input device may display symbols indicating the respective functions of the function keys executed by the word processor upon activation of the respective key. The functions may be changed during operation of the word processor. The word processor may allow the user to select an appropriate layout of the keyboard/input device, e.g. various layouts of various countries may be selectable and the Dvorak layout may be selectable. The word processor may allow the user to specify the function of each key of the keyboard/input device thereby creating an individual keyboard/key layout. It is an important advantage of the keyboard/input device according to the invention that the layout of the keyboard/input device may easily be changed from one alphabet to another and/or from the layout of one country to another. For example, the keyboard/input device according to the invention may display layouts of the European, Japanese, Arabic, Russian, Chinese, etc., alphabet.

The keyboard/input device may have a single display for displaying the labels of all keys of the keyboard; however the display may be divided into a plurality of separate display units. Some keys of the keyboard/input device may be conventional keys with fixed labels.

The display may reside on a flexible or rigid substrate.

Several display technologies are available that may reside on a flexible substrate or on a rigid substrate. For example, an organic light emitting diode (OLED) display may reside on a flexible substrate, such as a very flexible metallic foil, a flexible polymeric foil, etc. OLEDs can be printed onto flexible substrates in the same way as inks are sprayed onto paper during printing. Since OLEDs can be printed onto any suitable substrate using inkjet printer technology, they can theoretically have a significantly lower cost than LCDs or plasma displays.

An organic light-emitting diode (OLED) is a special type of light-emitting diode in which the emissive layer comprises a thin-film of certain organic compounds. Originally, small molecule organic light emitting diodes (SMOLED), i.e. small organic molecules that emit light when stimulated electrically, were used; however, today's OLEDs may typically utilize large polymer molecules for light emission sometimes termed PLED (polymer light emitting diode). PLEDs have the major advantage of being solution processable, and can therefore be applied to substrates using techniques such as ink jet printing. Dendrimer technology may also be applied in OLEDs. Dendrimers is a class of molecules featuring a high degree of branching and which can be designed to offer specific performance characteristics. In particular, in display technologies, dendrimers can be applied to small molecules to give them some of the properties of polymer systems e.g. solution processability.

In a passive matrix OLED (PMOLED), the cathode and anode are arranged in strips perpendicular to each other. The intersections of the cathode and anode make up the pixels where light is emitted. External circuitry applies current to selected strips of anode and cathode, determining which pixels get turned on and which pixels remain off. Again, the brightness of each pixel is proportional to the amount of applied current. Presently, PMOLEDs may be most efficient for text and icons and are best suited for small screens (e.g. 2 to 3 inch screens) such as screens for cell phones, PDAs and MP3 players, etc.

In an Active-matrix OLED (AMOLED), the cathode and anode constitute full layers, but the anode layer overlays a thin film transistor (TFT) array that forms a matrix. The TFT array is the circuitry that determines which pixels get turned on to form an image. AMOLEDs consume less power than PMOLEDs because the TFT array requires less power than external circuitry, so they are efficient for large displays. AMOLEDs also have faster refresh rates suitable for video. Typically, AMOLEDs are use in computer monitors, large screen TVs and electronic signs or billboards.

One of the great benefits of an OLED display over the traditional LCD displays is that OLEDs do not require a backlight to function. This means that they draw far less power and, when powered from a battery, can operate longer on the same charge. It is also known that OLED based display devices may be more effectively manufactured than liquid-crystal and plasma displays.

OLED technology is currently used in commercial applications such as small screens for mobile phones and portable digital music players, car radios and digital cameras and also in high resolution micro-displays for head-mounted displays. Such portable applications favor the high light output of OLEDs for readability in sunlight, combined with their low power drain.

Electrophoretic displays, electro-wetting displays, polymer LCD displays, etc. are other examples of display technologies that may also reside on a flexible substrate.

The display may provide a conventional dot matrix arrangement below each of the transparent key caps.

In accordance with the present invention, the keyboard/input device may be capable of representing every character, number and other symbols of every written language.

Further, the keyboard/input device may also display an indication of the function of function keys used in connection with games and other software programs.

For example, the keyboard/input device may sequentially display certain key labels in a way that guides the user through a certain software program thereby eliminating the need of consulting a manual for the program.

Further, the keyboard/input device may display key labels corresponding to frequently used functions of a word processor, spreadsheet, database, CAD/CAM, etc., thereby facilitating the use of the word processor, spreadsheet, database, CAD/CAM, respectively.

Still further, the label display flexibility of the keyboard/input device according to the present invention may be used to reduce the number of keys in a keyboard/input device for e.g. a mobile phone, a PDA computer, or other portable equipment.

The keyboard/input device according to the present invention may advantageously be utilized in any means of transportation, e.g. a car, train, airplane, ship, spacecraft, etc., e.g. for control of the means of transportation.

FIG. 1 illustrates an exploded view of components of a keyboard 100 according to the present invention. The top surfaces of the key caps 101 are transparent so that the user can view the displayed key labels 103 through the transparent top surface of the respective key caps 101. For each key at least one communication member 102 communicates a motion or a depression from the key cap 101 and to the detection structure 107. The illustrated detection structure 107 has a detection structure surface 106. The detection structure 107 may be any structure that is configured for detection the motion of the communication member. The through holes 105 of the display 104 may be cutouts or the display 104 may be manufactured directly with such missing parts of the display 104. A through hole 105 of the display 104 may enable a communication member 102 to be displaced within the through hole 105, e.g. in the same direction as the displacement of a corresponding key cap 101 during depression thereof. Thus, a communication member 102 may for instance be physically connected or connectable with the detection structure 107, such that the key caps 101 are connected or connectable with the detection structure 107 by means of the communication members 102 through the through holes 105. The keyboard 100 may comprise a first display interface and a second display interface situated at adjacent sides of the display 104.

Figure 2:
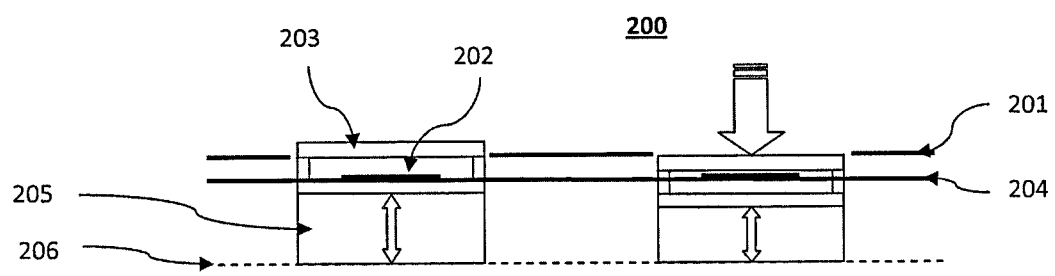
FIG. 2 illustrates a cross sectional side view of a keyboard according to the present invention.
Figure 3:
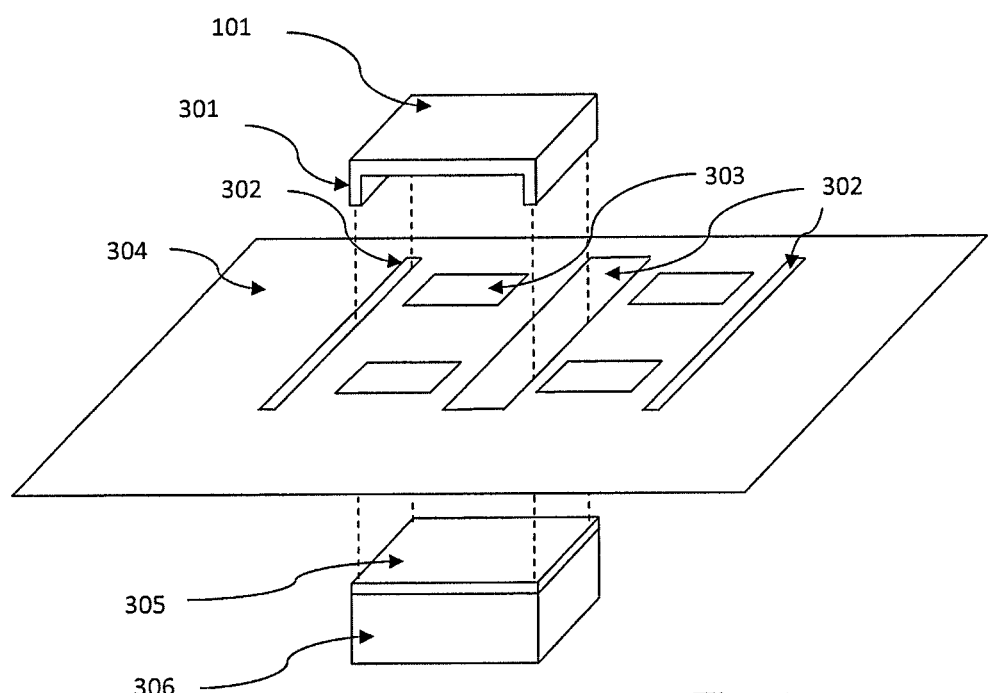
FIG. 3 illustrates schematically an exploded view of a keyboard according to the present invention.

FIG. 2 illustrates a cross sectional side view of a keyboard 200 according to the present invention, such as the keyboard 100 illustrated in FIG. 1 or the keyboard 300 illustrated in FIG. 3. The keyboard 200 comprises a plurality of keys, at least one detection structure 206, and a display 204 for displaying individual labels 202 of the plurality of keys.

In FIG. 2, two keys are illustrated. To the left is a key with a key cap in a non-depressed position. To the right is a key with a key cap in a depressed position. Motion is illustrated by means of the broad arrows.

Each of the plurality of keys has a depressible key cap 203 with a transparent top surface. Each of the plurality of keys further has at least one communication member configured for communicating a depression of the corresponding key cap 203.

The at least one detection structure is configured for detecting individual depression of each of the plurality of key caps 203 as communicated by at least one respective communication member.

The display is arranged between the detection structure 206 and the plurality of key caps 203, such that the individual labels 202 of the plurality of keys are viewable through the transparent top surfaces of the respective key caps 203.

The display furthermore comprises a plurality of through holes. The plurality of through holes enables the plurality of communication members to communicate there through to the at least one detection part 206 for detecting individual depression of each of the plurality of key caps 203.

Furthermore, a top cover 201 is illustrated.

The detection part 206 may comprise individual parts 205 for each key of the keyboard 200.

FIG. 3 illustrates an exploded view of the basic components of a keyboard 300 according to the present invention. The top surfaces of the key caps 101 are transparent so that the user can view the displayed key labels 303 through the transparent top surface of the respective key caps 101. For each key at least one communication member 301 communicates a motion or a depression from the key cap 101 and to the detection structure 306. The illustrated detection structure 306 has a detection structure surface 305. The detection structure 306 may be any structure that is configured for detection the motion of the communication member 301. The elongated through holes 302 of the display 304 may be cutouts or the display 304 may be manufactured directly with such missing parts of the display 304. An elongated through hole 302 of the display 304 may enable a communication member 301 to be displaced within the elongated through hole 302, e.g. in the same direction as the displacement of a corresponding key cap 101 during depression thereof. Thus, a communication member 301 may for instance be physically connected or connectable with the detection structure 306, such that the key caps 101 are connected or connectable with the detection structure 306 by means of the communication members 301 through the elongated through holes 302. The keyboard 300 may comprise a display interface at each elongated through hole 302 or at some of the elongated through holes 302.

Figure 4:
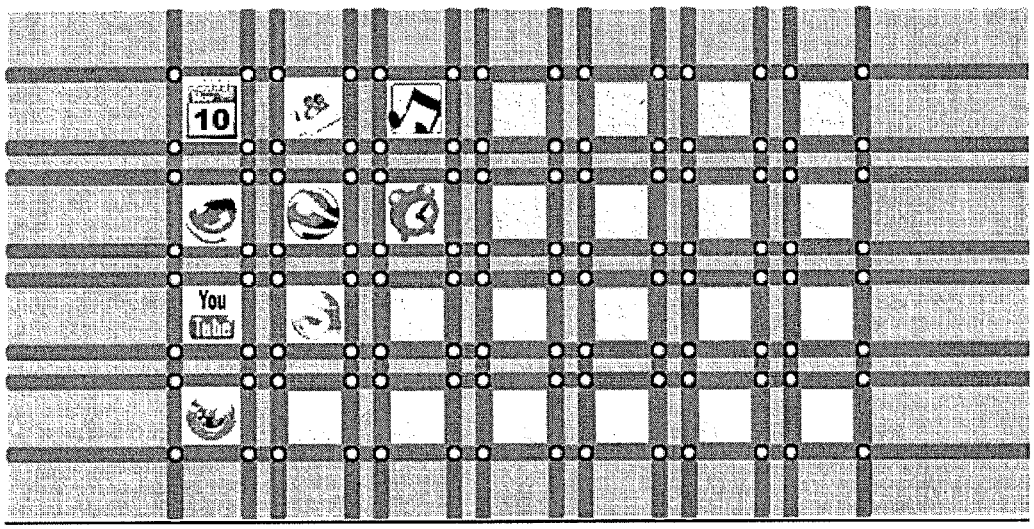
FIG. 4 illustrates a top view of a keyboard display with through holes and addressing electrodes (top) and when assembled with transparent key caps (bottom).
Figure 4:
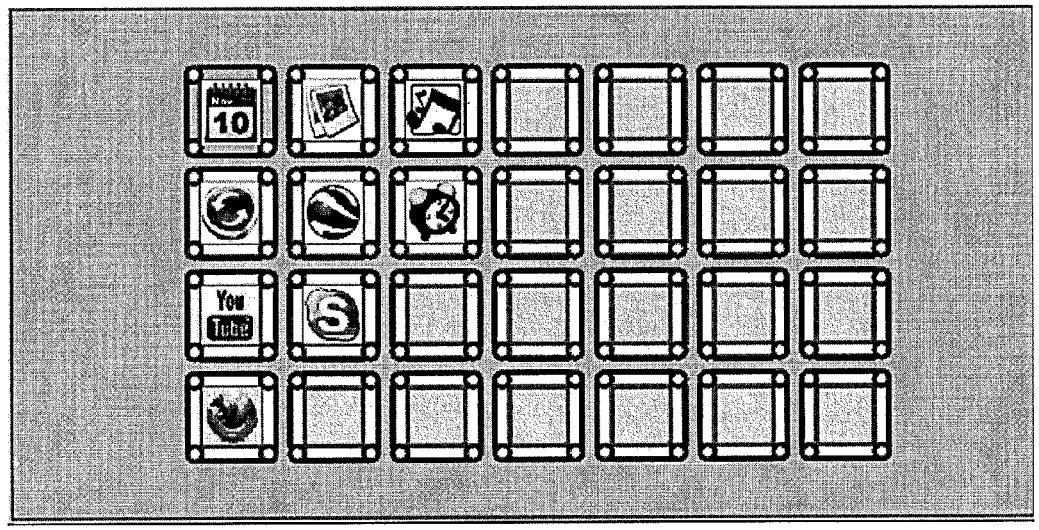

FIG. 4 illustrates the keyboard according to the present invention in use displaying various symbols on the integrated display. It illustrates in top view a keyboard display with through holes and addressing electrodes (top part of FIG. 4) and when assembled with transparent key caps (bottom part of FIG. 4). The keyboard displayed in FIG. 4 is an embodiment of a keyboard according to the present invention. The addressing electrodes are parallel to the thick solid black lines.

Figure 5:
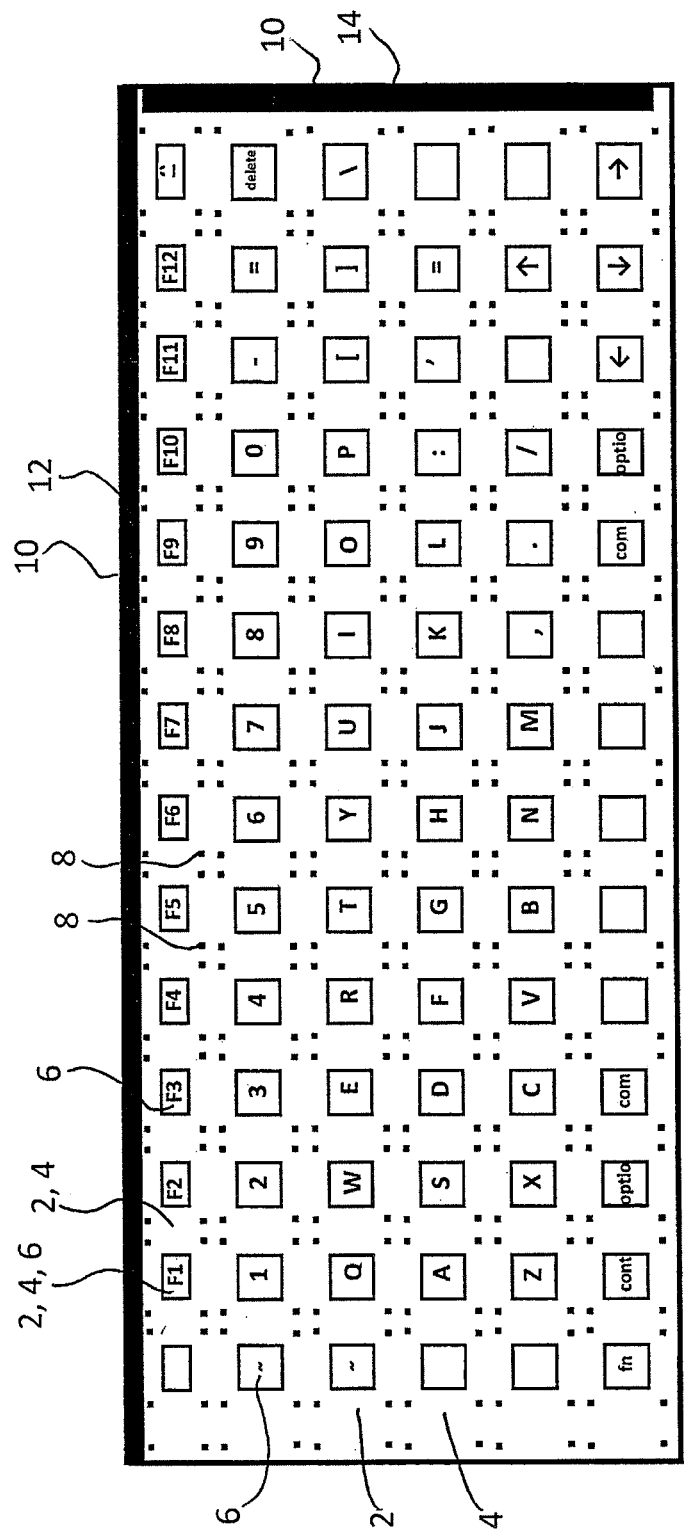
FIG. 5 schematically illustrates an embodiment of an at least one display of an input device according to the present invention.

FIG. 5 schematically illustrates an embodiment of an at least one display 2 of an input device according to the present invention. The embodiment of the at least one display 2 illustrated in FIG. 5 is similar to the display of the embodiment of FIG. 1 and similar to the display of the embodiment of FIG. 4.

The at least one display 2 is configured for being part of an input device according to the present invention, which input device comprises a plurality of keys (not illustrated in FIG. 5), at least one detection structure (not illustrated in FIG. 5), and wherein the at least one display 2 comprises a first display 4. The at least one display 2 may form part of an input device such as the keyboard 100 partly illustrated in FIG. 1 or the keyboard illustrated in FIG. 4.

The at least one display 2 is configured for being a part of an input device according to the present invention wherein: the plurality of keys may comprise a first group of keys, each of the plurality of keys has a depressible key cap with a top surface that may be at least semi-transparent, each of the plurality of keys further has at least one communication member configured for communicating a depression of the corresponding key cap, and wherein the at least one detection structure is configured for detecting individual depression of each of the plurality of key caps as communicated by at least one respective communication member of any of the plurality of keys.

The at least one display 2 is configured for being a part of an input device according to the present invention wherein: each of the plurality of keys may comprise at least one guide member configured for guiding a depression of the key cap of the respective key of the plurality of keys, and wherein the (possible/optional) at least one guide member includes the at least one communication member of the corresponding key. Furthermore, the at least one guide member/communication member for each of the plurality of keys may comprise at least four guide members/communication members. Each of the plurality of through holes 8 surrounding each individual label 6 are configured for enabling a guide member/communication member of the corresponding key to communicate there through.

The first display 4 forms a first sheet. The first display 4 is configured for providing image information of individual labels 6 for each key of the plurality of keys. The first display 4 is configured to be arranged between the at least one detection structure (not illustrated in FIG. 5) and the plurality of key caps (not illustrated in FIG. 5), such that the individual labels 6 of the plurality of keys are viewable via the at least semi-transparent top surfaces (not illustrated in FIG. 5) of the respective key caps.

In FIG. 5 (and in FIGS. 6-13 as well as FIGS. 1-4) the respective boundaries for provision of image information of individual labels 6 are marked by rectangles and/or elevations for illustrative purposes.

The first display 4 comprises a plurality of through holes 8 (illustrated by black solid squares). The plurality of through holes 8 are configured for enabling the plurality of communication members to communicate there through (e.g. physically there through) to the at least one detection part for detecting individual depression of each of the plurality of key caps. Thus, the first display 4 is configured such that at least a part of each communication member may be moveable within a through hole 8 of the plurality of through holes 8.

The embodiment of the first display 4 illustrated in FIG. 5 is configured such that the plurality of through holes 8 comprises at least four through holes 8 for each for each area for displaying a label 6 (and possibly for each key). Furthermore, the first display 4 is configured for enabling one communication member to communicate through each through hole 8. In one or more alternative embodiments, the plurality of through holes may comprise fewer through holes than the number of communication members. For instance, for such one or more alternative embodiments, the input device may be configured such that a first plurality of communication members may communicate in parallel through a first shared through hole, where the first plurality of communication members may comprise communication members of different keys of the plurality of keys. This may e.g. be the case if the four through holes 8 surrounded by the areas in FIG. 5 displaying the labels: "F9", "F10", "9", and "0", respectively, are constituted by one, two, or three through holes instead of four as illustrated in FIG. 5. In one or more embodiments, the plurality of through holes may comprise more through holes than the number of communication members. This may for instance be the case if a through hole is intended for any guide member that is not a communication member.

The first display 4 is configured such that each communication member may communicate through individual through holes 8.

The first display 4 comprises a plurality of display interfaces 10 configured to feed the first display 4 with data for provision of the image information. The plurality of display interfaces 10 includes a first display interface 12 and a second display interface 14. The first display interface 12 and the second display interface 14 are situated at adjacent sides of the first display 4.

The first display 4 is configured for having a first extension that is larger than a combined extension of two adjacent key caps of the keys of the first group of intended keys, and which furthermore is larger than or equal to a combined extension of all the key caps of the keys of the first group of intended keys. In this case, the first group corresponds to a row of keys, e.g. the row including "F1", "F2", "F3", etc. The first extension is defined along the side of the first display 4 where the first display interface 12 is situated.

The first display 4 comprises an OLED display, more specifically an AMOLED display. The first display 4 forms a substantially planar sheet.

The first display 4 is configured for displaying the individual labels 6 of the plurality of keys. The first display 4 is configured for being comprised in an input device where the at least semi-transparent top surface of each key cap of the plurality of keys is a transparent top surface which enables that the individual labels of the plurality of keys are viewable through the transparent top surfaces of the respective key caps.

Figure 6:
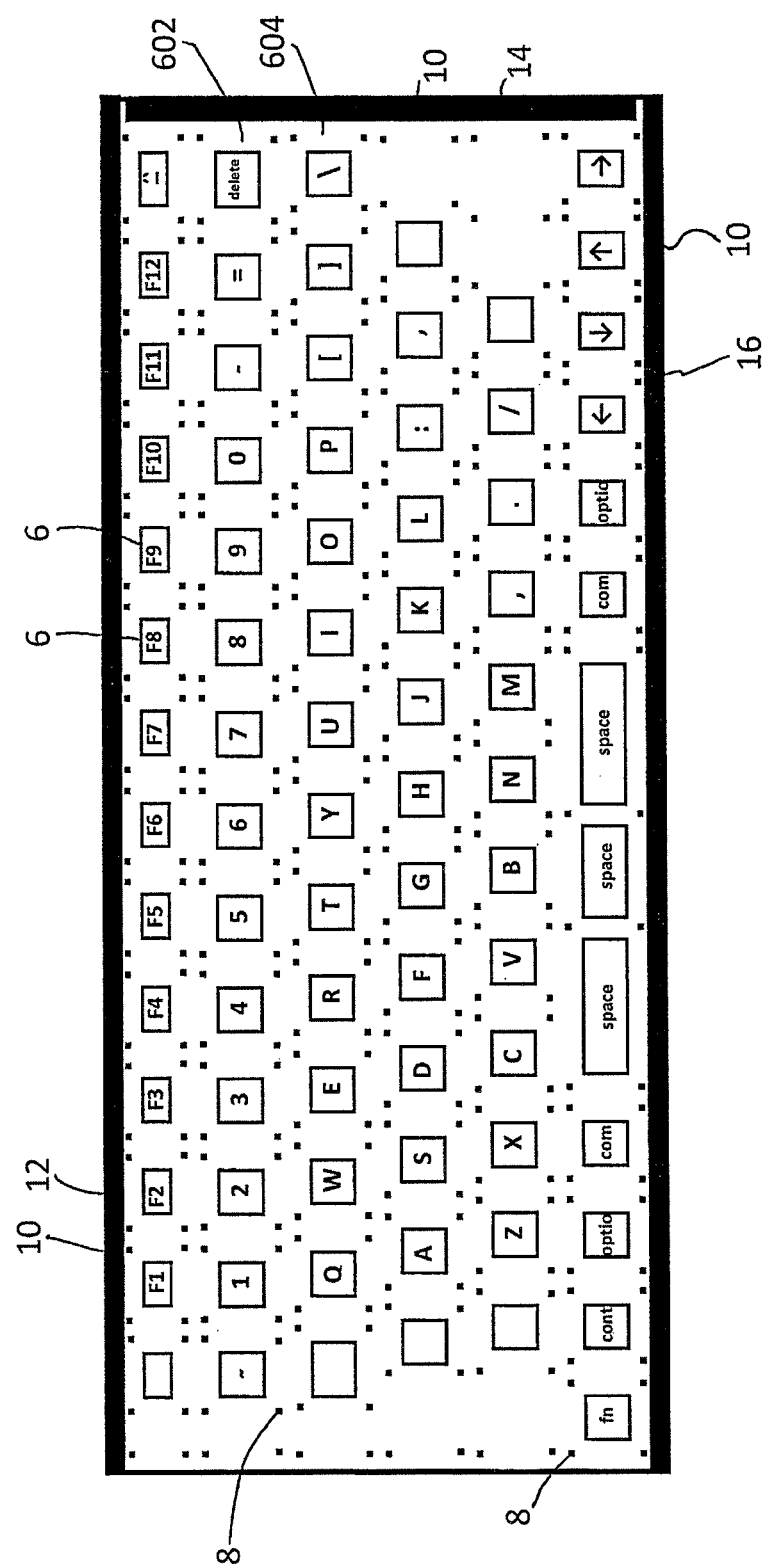
FIG. 6 schematically illustrates an embodiment of an at least one display of an input device according to the present invention.
Figure 9:
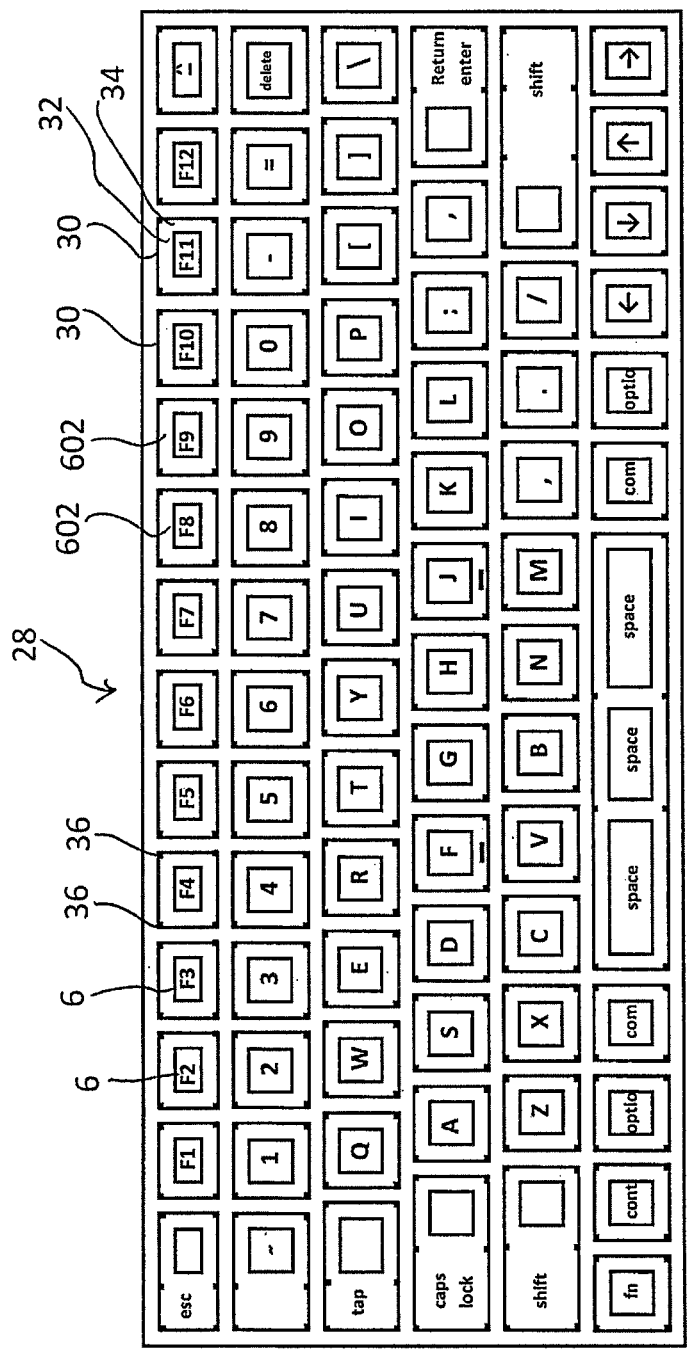
FIG. 9 schematically illustrates a top view of an embodiment of an input device according to the present invention.

FIG. 6 schematically illustrates an embodiment of an at least one display 602 of an input device according to the present invention. The at least one display 602 comprises a first display 604. The display 602, 604 of FIG. 6 has many features in common with the display 2, 4 of FIG. 5. Therefore only the differences will be described in the following. A difference is that for the display 602 of FIG. 6, the plurality of display interfaces 10 includes a third display interface 16. Furthermore, the plurality of through holes 8 and the areas for provision of image information of individual labels 6 are distributed differently as seen by comparison of FIG. 6 and FIG. 5. For both the display 2 and the display 602 the areas for provision of image information of individual labels 6 are distributed according to a corresponding desired distribution of key caps. For the display 602 the desired distribution of key caps is as illustrated in FIG. 9 (see key caps 32). The through holes 8 are distributed according to the distribution of the areas for provision of image information of individual labels 6.

The third display interface 16 (in connection with the first display interface 12 and the second display interface 14) enables the areas for provision of image information of individual labels 6 to provide image information despite of the distribution of through holes 8. This would not be possible with only two of the three display interfaces. The need for the third display interface 16 for a display (e.g. 602) where the through holes 8 and areas for provision of image information of individual labels 6 are not distributed in a rectangular array is illustrated in more detail by means of FIG. 7.

The plurality of display interfaces 12, 14, 16 are configured to feed the first display from three different angles, i.e. from two opposing directions (from the first display interface 12 and the second display interface 14) and a perpendicular direction thereto (from the third display interface 16).

Figure 7:
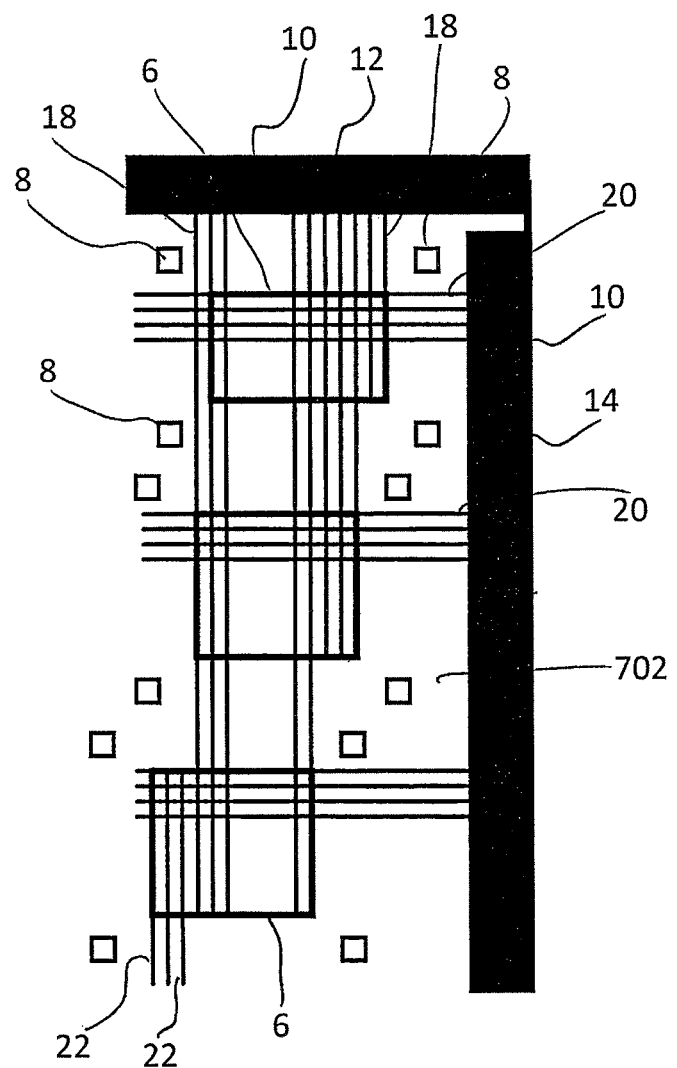
FIG. 7 schematically illustrates a part of an embodiment of an at least one display of an input device according to the present invention.

FIG. 7 schematically illustrates a part of an embodiment of an at least one display 702 of an input device according to the present invention.

FIG. 7 illustrates a plurality of first channels (or addressing channels) 18 emanating from the first display interface 12, a plurality of second channels 20 emanating from the second display interface 12, and a plurality of third channels 22 emanating from a third display interface (not illustrated). The third display interface is at the opposite side of the at least one display 702 compared to the first display interface 12.

Due to the regular order of the channels 18, 20, 22 and due to the placement of the through holes 8, all parts (or pixels) of all three illustrated areas for provision of image information of individual labels 6 cannot be addressed/activated by means of channels 18 emanating from the first display interface 12 and channels 20 emanating from the second display interface 14 only (see in particular FIG. 7: the left part of the lowermost area for provision of image information of individual labels 6). This problem may be solved by the provision of the third display interface being connected to the plurality of third addressing channels 22 emanating from the third display interface.

Figure 8:
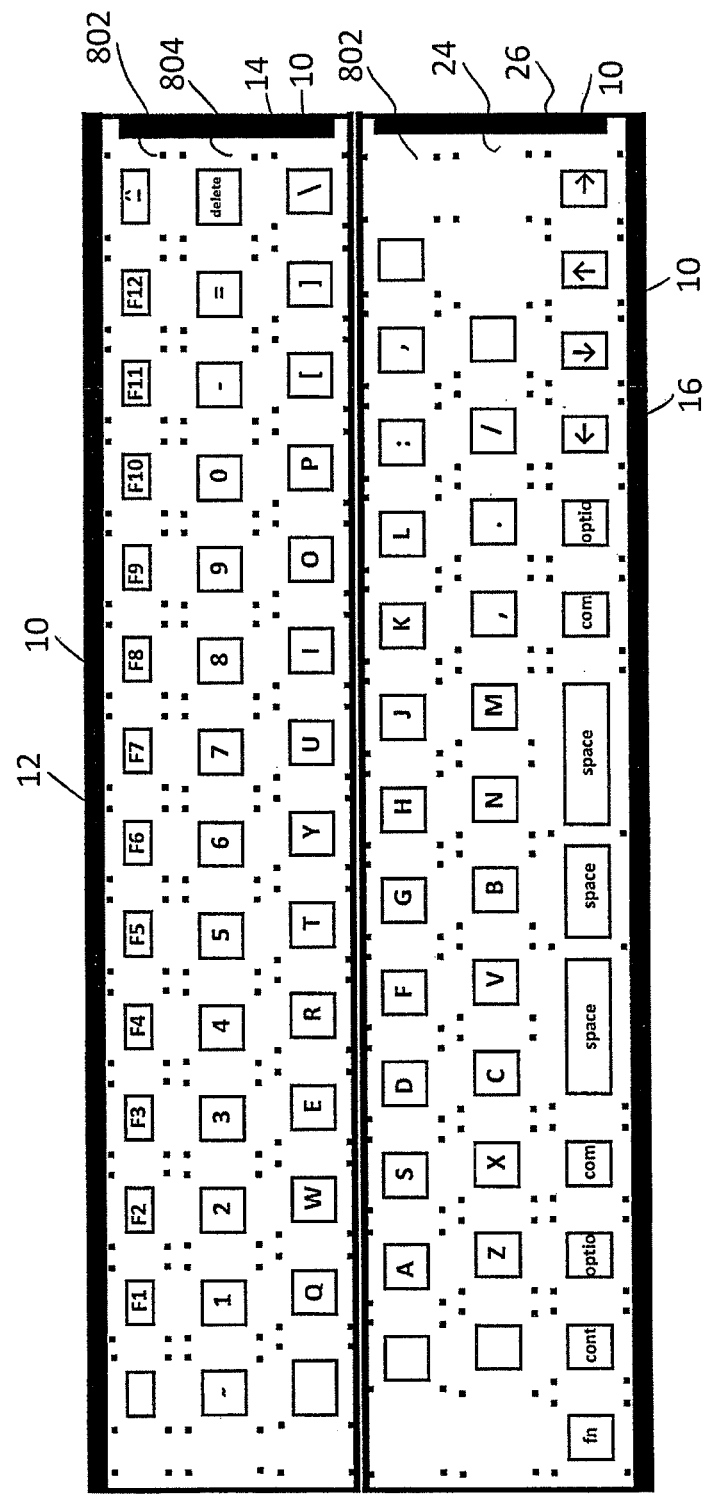
FIG. 8 schematically illustrates an embodiment of an at least one display of an input device according to the present invention.

FIG. 8 schematically illustrates an embodiment of an at least one display of an input device according to the present invention.

FIG. 8 illustrates an alternative embodiment to that of FIG. 6 for achieving a similar solution, i.e. for provision of an at least one display that is configured for provision of image information of individual labels 6 for the desired distribution of keys as illustrated in FIG. 9.

Differences between the display 602 of FIG. 6 and the display 802 of FIG. 8 is that the at least one display 802 of FIG. 8 comprises both a first display 804 and a second display 24, and that the plurality of display interfaces 10 includes a fourth display interface 26. By putting the first display 804 and the second display 24 next to each other as illustrated in FIG. 8, a similar distribution of all the areas for provision of image information of individual labels 6 is provided as for the display illustrated in FIG. 6.

The second display 24 forms a second sheet.

The at least one display 802 is configured for being a part of an input device according to the present invention wherein the plurality of keys comprises a second group of keys. The second display is configured for providing image information of individual labels for each key of the second group of keys.

The second display 24 is configured for being arranged between the at least one detection structure and the plurality of key caps of the second group of keys, such that individual labels of the second group of keys are viewable via the transparent top surfaces of the respective key caps.

The first display interface 12 and the second display interface 14 are configured to feed the first display 804 and the third display interface 16 and the fourth display interface 26 are configured to feed the second display 24.

FIG. 9 schematically illustrates a top view of an embodiment of an input device 28 according to the present invention.

The input device 28 comprises a plurality of keys 30, at least one detection structure (not illustrated in FIG. 5), and at least one display 602.

The plurality of keys 30 comprises a first group of keys. The first group of keys may includes the row of keys 30 including the shown labels "F1", "F2", "F3", etc.

Each of the plurality of keys 30 has a depressible key cap 32 with an at least semi-transparent top surface 34.

Each of the plurality of keys further has at least one communication member 36 configured for communicating a depression of the corresponding key cap 32.

The at least one detection structure is configured for detecting individual depression of each of the plurality of key caps 32 as communicated by at least one respective communication member 36 of any of the plurality of keys 30.

Figure 10:
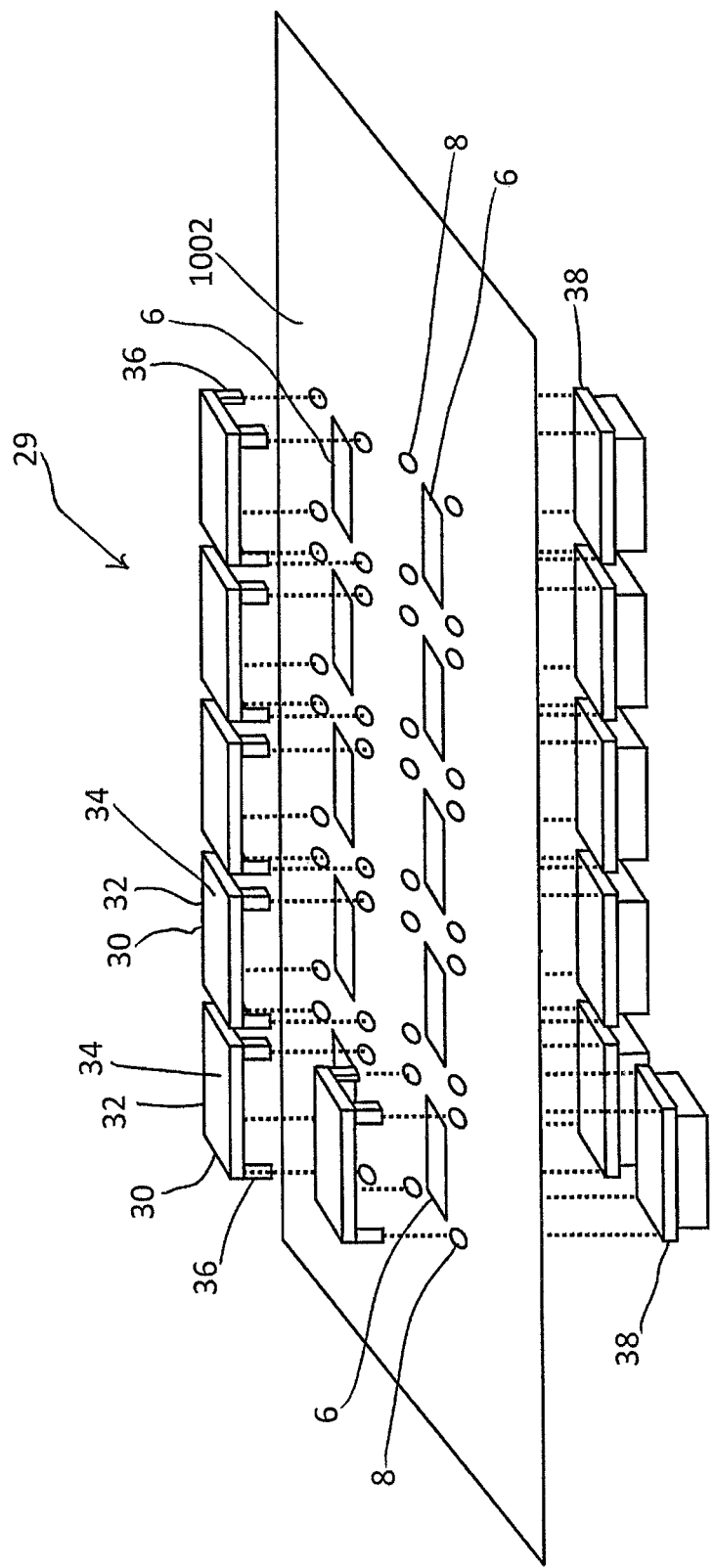
FIG. 10 schematically illustrates an exploded perspective view of an embodiment of an input device according to the present invention.

FIG. 10 schematically illustrates an exploded perspective view of an embodiment of an input device 29 according to the present invention. The dotted lines show separation in distance of parts of the input device in the exploded view. The embodiment of FIG. 10 is similar in structure and functioning to the embodiment of FIG. 9. However, for the embodiment of FIG. 10 fewer keys 30, through holes 8, and areas for provision of image information of individual labels 6 are illustrated.

The input device 29 comprises a plurality of keys 30, at least one detection structure 38, and at least one display 1002. The plurality of keys 30 comprises a first group of keys. Each of the plurality of keys 30 has a depressible key cap 32 with an at least semi-transparent top surface 34. Each of the plurality of keys further has at least one communication member 36 configured for communicating a depression of the corresponding key cap 32. The at least one detection structure 38 is configured for detecting individual depression of each of the plurality of key caps 32 as communicated by at least one respective communication member 36 of any of the plurality of keys 30.

Figure 11:
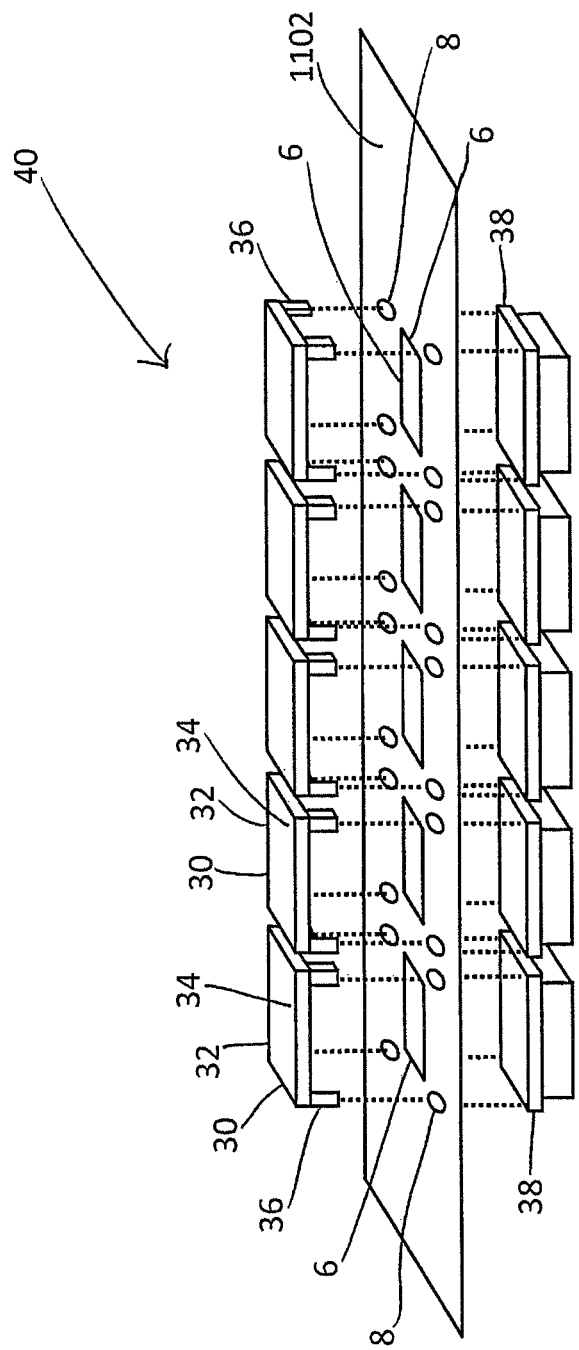
FIG. 11 schematically illustrates an exploded perspective view of an embodiment of an input device according to the present invention.

FIG. 11 schematically illustrates an exploded perspective view of an embodiment of an input device 40 according to the present invention. The dotted lines show separation in distance of parts of the input device in the exploded view.

The embodiment of FIG. 11 is similar in structure and functioning to the embodiment of FIG. 9 and to the embodiment of FIG. 10. However, compared to the embodiment of FIGS. 9 and 10, respectively, for the embodiment of FIG. 11 fewer keys 30, through holes 8, and areas for provision of image information of individual labels 6 are illustrated.

The input device 40 comprises a plurality of keys 30, at least one detection structure 38, and at least one display 1102. The plurality of keys 30 comprises a first group of keys. Each of the plurality of keys 30 has a depressible key cap 32 with an at least semi-transparent top surface 34. Each of the plurality of keys further has at least one communication member 36 configured for communicating a depression of the corresponding key cap 32. The at least one detection structure is configured for detecting individual depression of each of the plurality of key caps 32 as communicated by at least one respective communication member 36 of any of the plurality of keys 30.

Figure 12:
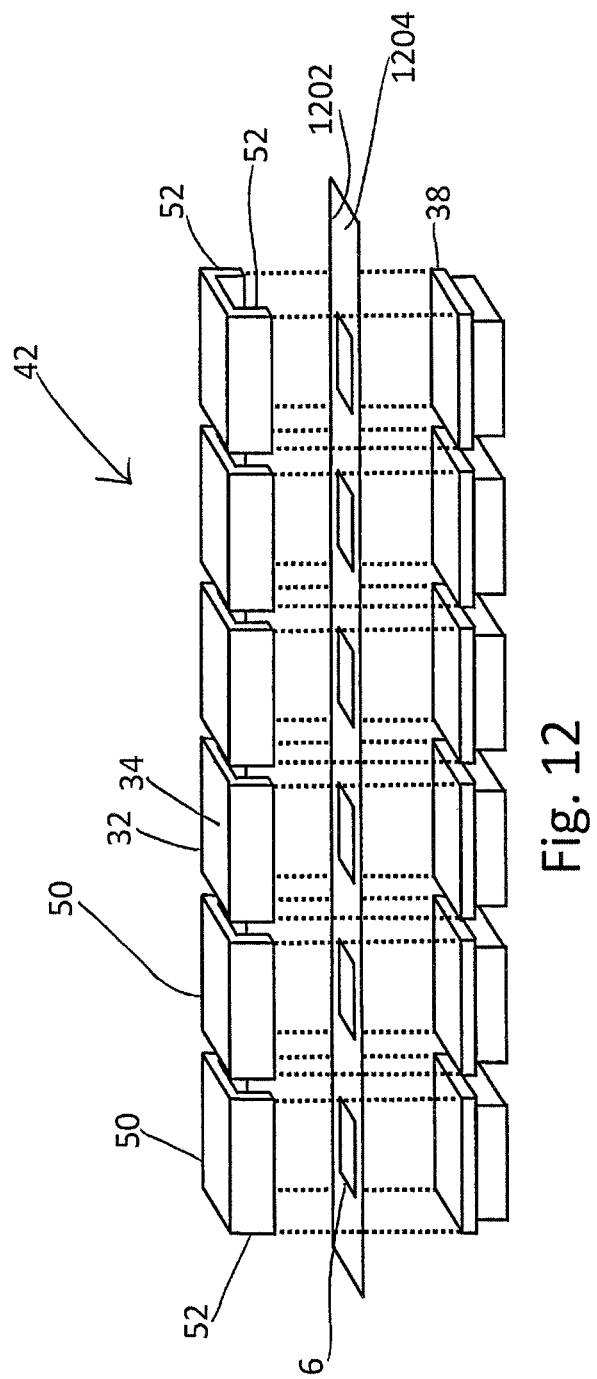
FIG. 12 schematically illustrates an exploded perspective view of an embodiment of an input device according to the present invention.

FIG. 12 schematically illustrates an exploded perspective view of an embodiment of an input device 42 according to the present invention. The dotted lines show separation in distance of parts of the input device in the exploded view.

The input device 42 comprises a plurality of keys 50, at least one detection structure 38, and at least one display 1202. The plurality of keys 50 comprises a first group of keys. For the embodiment 42 of FIG. 12, the first group of keys includes all of the plurality of keys 50 of the embodiment 42. Each of the plurality of keys 50 has a depressible key cap 32 with an at least semi-transparent top surface 34. Each of the plurality of keys 50 has at least one communication member 52 configured for communicating a depression of the corresponding key cap 32. The at least one detection structure 38 is configured for detecting individual depression of each of the plurality of key caps 32 as communicated by at least one respective communication member 52 of any of the plurality of keys 50. Each communication member 52 comprises a substantially rigid member being rigidly connected to the corresponding key cap 32. The substantially rigid member is shaped like a plate-like structure. The at least one display 1202 comprises a first display 1204 forming a first sheet. The first display 1204 is configured for providing image information of individual labels 6 for each key 50 of the plurality of keys 50. The first display 1204 is arranged between the at least one detection structure 38 and the plurality of key caps 32, such that the individual labels 6 of the plurality of keys 50 are viewable via the at least semi-transparent top surfaces 34 of the respective key caps 32.

Each of the plurality of keys 50 comprises at least one guide member configured for guiding a depression of the key cap 32 of the respective key 50 of the plurality of keys 50. The at least one guide member includes the at least one communication member 52 of the corresponding key 50. The at least one guide member for each of the plurality of keys 50 comprises two guide members.

The input device 42 comprises a plurality of display interfaces 1210 (see FIG. 13 for further details) configured to feed the first display 1204 with data for provision of the image information. The plurality of display interfaces 1210 includes a first display interface 1212 and a second display interface 1214 (see FIG. 13 for further details).

The at least one detection structure 38 comprises a plurality of detection parts 38 including a detection part 38 for each of the plurality of keys.

The first display 1204 has a first extension that is larger than a combined extension of two adjacent key caps 32 of the keys 50 of the first group of keys. The first extension is furthermore larger than (or may for one or more other embodiments be equal to or substantially equal to) a combined extension of all the key caps of the keys of the first group of keys.

The first display 1204 has a second extension that is smaller than a first distance between two guide members of a key 50 of the first group of keys. Thus, no through holes are needed for accommodating the communication members 52.

The first display 1204 is configured for displaying the individual labels 6 of the plurality of keys 50. The at least semi-transparent top surface 34 of each key cap 32 of the plurality of keys 50 is a transparent top surface. The individual labels 6 of the plurality of keys 50 are viewable through the transparent top surfaces 34 of the respective key caps 32. The at least one display comprises an OLED display. The first display 1204 forms a substantially planar sheet.

Figure 13:
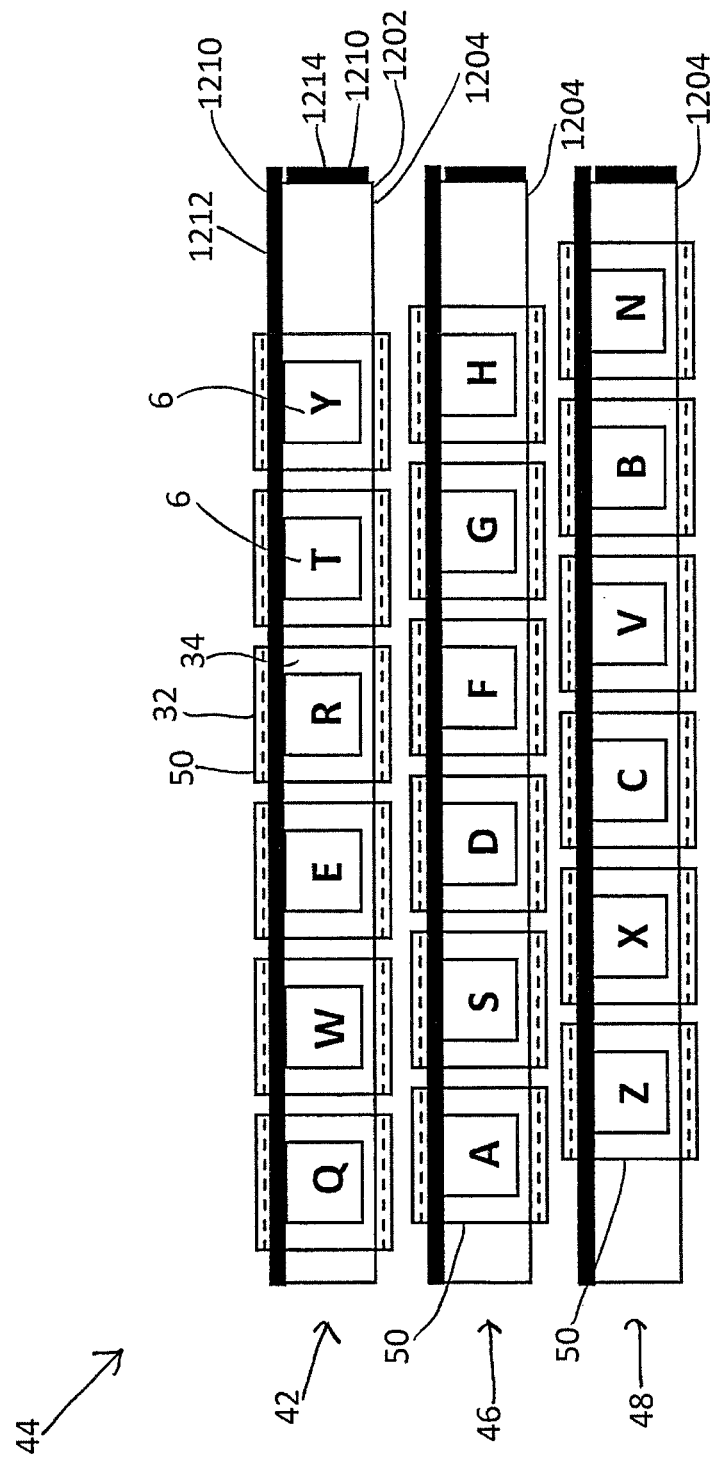
FIG. 13 schematically illustrates a top view of an embodiment of an input device according to the present invention.

FIG. 13 schematically illustrates a top view of an embodiment of an input device 44 according to the present invention.

The input device 44 includes the input device 42 and two additional input devices 46, 48, that are substantially identical or similar to the input device 42. The only difference between the input device 42 and the two additional input devices 46, 48 is a slight displacement of the keys 50 in relation to the first display 1204.

Figure 14:
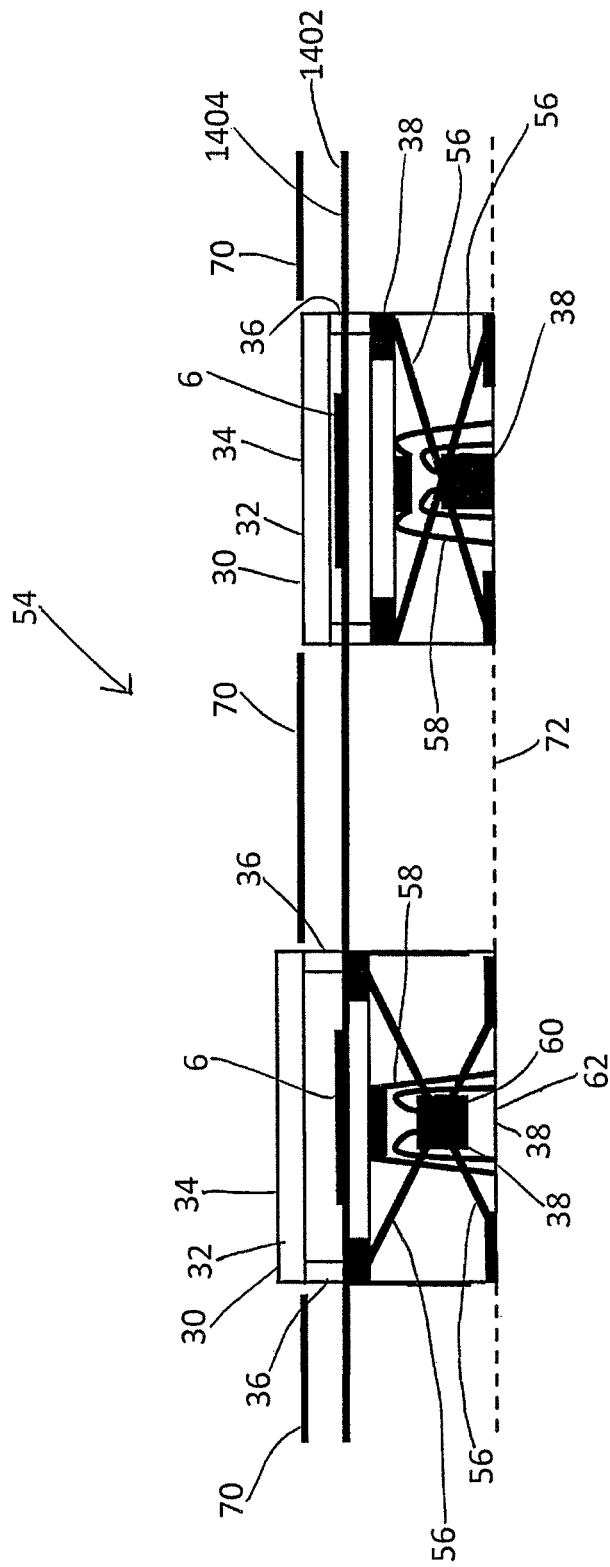
FIG. 14 schematically illustrates a cutaway side view of an embodiment of an input device according to the present invention.

FIG. 14 schematically illustrates a cutaway side view of an embodiment of an input device 54 according to the present invention.

The input device 54 comprises a plurality of keys 30, at least one detection structure 38, and at least one display 1402. The key 30 to the right is in a depressed state while the key 30 to the left is in a non-depressed state. The input device furthermore comprises a frame/housing 70. The frame 70 substantially enclose the at least one display 1402 and the detection structure 38. Parts of the frame 70 are however not illustrated in FIG. 14.

The plurality of keys 30 comprises a first group of keys. Each of the plurality of keys 30 has a depressible key cap 32 with an at least semi-transparent top surface 34, each of the plurality of keys 30 further having at least one communication member 36 configured for communicating a depression of the corresponding key cap 32.

The at least one detection structure 38 is configured for detecting individual depression of each of the plurality of key caps 32 as communicated by at least one respective communication member 36 of any of the plurality of keys 30.

The at least one display 1402 comprises a first display 1404 forming a first sheet. The first display 1404 is configured for providing image information of individual labels 6 for each key 30 of the plurality of keys 30. The areas intended for provision of individual labels 6 are slightly elevated from the first display 1404 for illustrative purposes. The first display 1404 is arranged between the at least one detection structure 38 and the plurality of key caps 32, such that the individual labels 6 of the plurality of keys 30 are viewable via the transparent top surfaces 34 of the respective key caps 32.

The at least one detection structure 38 comprises at least one scissor-switch element 56 and one dome element 58 for each key 30 for provision of stability of displacement of the key cap and for provision of tactile feedback during depression of a key cap. The at least one detection structure 38 furthermore comprises a contact activation part 60 and a contact reception area 62 for each key 30. Each key 30 is configured such that when the key cap 32 is depressed to a certain extend (as illustrated for the right key 30 in FIG. 14) the contact activation part 60 is brought into contact with the corresponding contact reception area 62, such that the depression may be detected. However, the illustrated example is only an example out of a plurality of methods and devices known in the art for detecting a depression, all of which are comprises by the present invention. The dotted line 72 illustrated a plane with a plurality of contact reception areas 62, such as may be provided by a plate with contacts, such as a plastic sheet with contacts.

Figure 15:
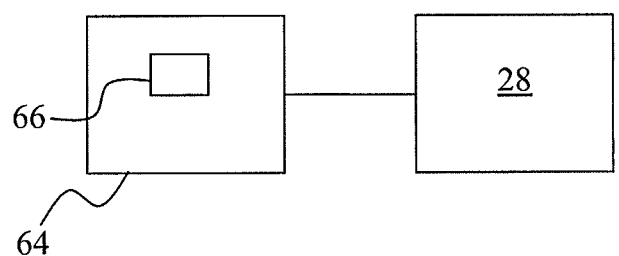
FIG. 15 schematically illustrates an embodiment of an apparatus with a processor that is connected to an input device according to the present invention.

FIG. 15 schematically illustrates an embodiment of an apparatus 64 with a processor 66 that is connected to an input device 28 according to the present invention.

The processor 66 is configured for receiving input from the input device 28 and being configured for controlling the at least one display of the input device 28 for provision of the individual labels of the plurality of keys of the input device in response to user input, which user input may be generated by a user by means of the input device 28.

The processor 66 is configured to execute an editor and to allow the user to define or chose a layout of the individual labels of the plurality of keys.

Figure 16:
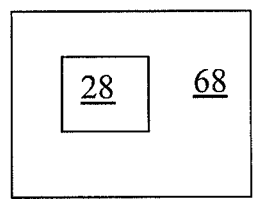
FIG. 16 schematically illustrates an embodiment of a device with an input device according to the present invention.

FIG. 16 schematically illustrates an embodiment of a device 68 with an input device 28 according to the present invention.

Particular possible aspects according to the present invention are described by a keyboard, device, and/or apparatus according to any of the subsequent points:

1. A keyboard comprising
a plurality of keys, each of the plurality of keys having a depressible key cap with a transparent top surface, each of the plurality of keys further having at least one communication member configured for communicating a depression of the corresponding key cap,
at least one detection structure configured for detecting individual depression of each of the plurality of key caps as communicated by at least one respective communication member, and
a display for displaying individual labels of the plurality of keys, the display being arranged between the detection structure and the plurality of key caps, such that the individual labels of the plurality of keys are viewable through the transparent top surfaces of the respective key caps, the display comprising a plurality of through holes, the plurality of through holes enabling the plurality of communication members to communicate therethrough to the at least one detection part for detecting individual depression of each of the plurality of key caps.

2. A keyboard according to point 1, wherein each communication member comprises a substantially rigid part being rigidly connected to the transparent top surface of the corresponding key cap.

3. A keyboard according to point 1 or 2, wherein at least a part of each communication member is displaceable within at least one of the plurality of through holes.

4. A keyboard according to any of the preceding points, wherein the at least one communication member for each of the plurality of keys comprises at least two communication members, such as at least three communication members, such as at least four communication members.

5. A keyboard according to any of the preceding points, wherein the plurality of through holes comprises a through hole for each of the plurality of communication members.

6. A keyboard according to any of the preceding points, wherein the at least one detection structure comprises a plurality of detection parts including one detection part for each of the plurality of keys.

7. A keyboard according to any of the preceding points, wherein the display is an OLED display, an electrophoretic display, an electro-wetting display, or a polymer LCD display.

8. A device, such as a mobile communication device or an electronic instrument, with a keyboard according to any of points 1-7.

9. An apparatus with a processor that is connected to a keyboard according to any of points 1-7, and that is adapted to receive inputs from the keyboard and to control the display for displaying the individual labels of the plurality of keys in response to a user input.

10. An apparatus according to point 9, wherein the processor is adapted to execute an editor and to allow the user to define the layout of the individual labels of the plurality of keys.

Particular possible aspects according to the present invention are described by an input device, device, and/or apparatus according to any of the subsequent items:

1. Input device comprising
a plurality of keys comprising a first group of keys, each of the plurality of keys having a depressible key cap with an at least semi-transparent top surface, each of the plurality of keys further having at least one communication member configured for communicating a depression of the corresponding key cap, at least one detection structure configured for detecting individual depression of each of the plurality of key caps as communicated by at least one respective communication member of any of the plurality of keys, and at least one display comprising a first display forming a first sheet, the at least one display being configured for providing image information of individual labels for each key of the plurality of keys, the at least one display being arranged between the at least one detection structure and the plurality of key caps, such that the individual labels of the plurality of keys are viewable via the transparent top surfaces of the respective key caps.

2. Input device according to item 1, wherein the first display has a first extension that is larger than a combined extension of two adjacent key caps of the keys of the first group of keys.

3. Input device according to item 2, wherein the first extension is larger than or equal to a combined extension of all the key caps of the keys of the first group of keys.

4. Input device according to any of the preceding items, wherein the at least one display comprises a plurality of through holes, the plurality of through holes enabling the plurality of communication members to communicate physically there through to the at least one detection part for detecting individual depression of each of the plurality of key caps.

5. Input device according to item 4, wherein at least a part of each communication member is moveable within at least one of the plurality of through holes.

6. Input device according item 4 or 5, wherein the plurality of through holes comprises a through hole for each of the plurality of communication members.

7. Input device according to any of the items 4-6, wherein the plurality of through holes comprises fewer through holes than the number of communication members.

8. Input device according to any of the items 4-7, wherein the input device is configured such that a first plurality of communication members may communicate in parallel through a first shared through hole, the first plurality of communication members comprising communication members of different keys of the plurality of keys.

9. Input device according to any of the items 4-8, wherein the input device is configured such that each communication member of at least one of the plurality of keys is configured for communicating through individual through holes.

10. Input device according to any of the preceding items, wherein each communication member comprises a substantially rigid member being rigidly connected to the corresponding key cap.

11. Input device according to any of the preceding items, wherein each of the plurality of keys comprises at least one guide member configured for guiding a depression of the key cap of the respective key of the plurality of keys, and wherein the at least one guide member includes the at least one communication member of the corresponding key.

12. Input device according to item 11, wherein the at least one guide member for each of the plurality of keys comprises at least two guide members, such as at least three guide members, such as at least four guide members.

13. Input device according to any of the preceding items, wherein the input device comprises a plurality of display interfaces configured to feed the at least one display with data for provision of the image information, the plurality of display interfaces including a first display interface and a second display interface.

14. Input device according item 13, wherein the plurality of display interfaces includes a third display interface.

15. Input device according item 14, wherein the plurality of display interfaces includes a fourth display interface.

16. Input device according to items 14 or 15, wherein the plurality of display interfaces are configured to feed the at least one display from at least three different angles.

17. Input device according to any of the preceding items, wherein the at least one display comprises a second display forming a second sheet and wherein the plurality of keys comprises a second group of keys, the first display being configured for providing image information of individual labels for each key of the first group of keys, the first display being arranged between the at least one detection structure and the plurality of key caps of the first group of keys, such that individual labels of the first group of keys are viewable via the transparent top surfaces of the respective key caps, the second display being configured for providing image information of individual labels for each key of the second group of keys, the second display being arranged between the at least one detection structure and the plurality of key caps of the second group of keys, such that individual labels of the second group of keys are viewable via the transparent top surfaces of the respective key caps.

18. Input device according to item 17 as dependent on item 16, wherein the first display interface and the second display interface are configured to feed the first display and wherein the third display interface and the fourth display interface are configured to feed the second display.

19. Input device according to any of the preceding items as dependent on item 2 and 12, wherein the first display has a second extension that is smaller than a first distance between two guide members of a key of the first group of keys.

20. Input device according to any of the preceding items, wherein the at least one detection structure comprises a plurality of detection parts including a detection part for each of the plurality of keys.

21. Input device according to any of the preceding items, wherein the at least one display comprises an OLED display, an electrophoretic display, an electro-wetting display, or a polymer LCD.

22. Input device according to any of the preceding items, wherein the at least one display is configured for displaying the individual labels of the plurality of keys, and wherein the at least semi-transparent top surface of each key cap of the plurality of keys is a transparent top surface, and wherein the individual labels of the plurality of keys are viewable through the transparent top surfaces of the respective key caps.

23. Input device according to any of the items 1-21, wherein the at least semi-transparent top surface of each of the key caps of the plurality of keys comprises a diffuse transmissive part and wherein the input device is configured for projecting the image information of the individual labels from the at least one display onto the respective diffuse transmissive parts, such that the individual labels of the plurality of keys are viewable at the respective key caps.

24. Input device according to any of the preceding items, wherein the first display forms a substantially planar sheet.

25. Input device according to any of the preceding items, wherein the input device is a keyboard.

26. Device, such as a mobile communication device or an electronic instrument, with an input device according to any of the preceding items.

27. Apparatus with a processor that is connected to an input device according to any of the items 1-25 or a device according to item 26, wherein the processor is configured for receiving input from the input device and being configured for controlling the at least one display for provision of the individual labels of the plurality of keys in response to user input.

28. Apparatus according to item 27, wherein the processor is configured to execute an editor and to allow the user to define or chose a layout of the individual labels of the plurality of keys.

The phrase "comprising" shall be regarded as a non-exhaustive term in the present disclosure. The phrase "including" shall be regarded as a non-exhaustive term in the present disclosure. For instance, an input device comprising (or including) four displays (or any number above four) is also considered to comprise (or include) three displays as well as to comprise (or include) two displays as well as to comprise (or include) one display. An input device comprising (or including) one display may also (but does not necessarily) comprise (or include) two displays and/or more displays.

Particular possible aspects according to the present invention are described by an input device, device, and/or apparatus according to any of the subsequent articles:

1. Input device comprising
   a plurality of keys comprising a first group of keys, each of the plurality of keys having a depressible key cap with an at least semi-transparent top surface, each of the plurality of keys further having at least one communication member configured for communicating a depression of the corresponding key cap,
   at least one detection structure configured for detecting individual depression of each of the plurality of key caps as communicated by at least one respective communication member of any of the plurality of keys, and
   at least one display comprising a first display forming a first sheet, the at least one display being configured for providing image information of individual labels for each key of the plurality of keys, the at least one display being arranged between the at least one detection structure and the plurality of key caps, such that the individual labels of the plurality of keys are viewable via the transparent top surfaces of the respective key caps.

2. Input device according to article 1, wherein the first display has a first extension that is larger than or equal to a combined extension of all the key caps of the keys of the first group of keys.

3. Input device according to article 1 or 2, wherein the at least one display comprises a plurality of through holes, the plurality of through holes enabling the plurality of communication members to communicate physically there through to the at least one detection part for detecting individual depression of each of the plurality of key caps.

4. Input device according to article 3, wherein the input device is configured such that each communication member of at least one of the plurality of keys are configured for communicating through individual through holes.

5. Input device according to any of the preceding articles, wherein each communication member comprises a substantially rigid member being rigidly connected to the corresponding key cap.

6. Input device according to any of the preceding articles, wherein each of the plurality of keys comprises at least one guide member configured for guiding a depression of the key cap of the respective key of the plurality of keys, and wherein the at least one guide member includes the at least one communication member of the corresponding key, and wherein the at least one guide member for each of the plurality of keys comprises at least two guide members, such as at least three guide members, such as at least four guide members.

7. Input device according to any of the preceding articles, wherein the input device comprises a plurality of display interfaces configured to feed the at least one display with data for provision of the image information, the plurality of display interfaces including a first display interface and a second display interface.

8. Input device according article 7, wherein the plurality of display interfaces includes a third display interface.

9. Input device according article 8, wherein the plurality of display interfaces includes a fourth display interface.

10. Input device according to articles 8 or 9, wherein the plurality of display interfaces are configured to feed the at least one display from at least three different angles.

11. Input device according to any of the preceding articles, wherein the at least one display comprises a second display forming a second sheet and wherein the plurality of keys comprises a second group of keys, the first display being configured for providing image information of individual labels for each key of the first group of keys, the first display being arranged between the at least one detection structure and the plurality of key caps of the first group of keys, such that individual labels of the first group of keys are viewable via the transparent top surfaces of the respective key caps, the second display being configured for providing image information of individual labels for each key of the second group of keys, the second display being arranged between the at least one detection structure and the plurality of key caps of the second group of keys, such that individual labels of the second group of keys are viewable via the transparent top surfaces of the respective key caps.

12. Input device according to any of the preceding articles as dependent on article 2 and 6, wherein the first display has a second extension that is smaller than a first distance between two guide members of a key of the first group of keys.

13. Input device according to any of the preceding articles, wherein the at least one display is configured for displaying the individual labels of the plurality of keys, and wherein the at least semi-transparent top surface of each key cap of the plurality of keys is a transparent top surface, and wherein the individual labels of the plurality of keys are viewable through the transparent top surfaces of the respective key caps.

14. Input device according to any of the articles 1-12, wherein the at least semi-transparent top surface of each of the key caps of the plurality of keys comprises a diffuse transmissive part and wherein the input device is configured for projecting the image information of the individual labels from the at least one display onto the respective diffuse transmissive parts, such that the individual labels of the plurality of keys are viewable at the respective key caps.

15. Apparatus with a processor that is connected to an input device according to any of the preceding articles, wherein the processor is configured for receiving input from the input device and being configured for controlling the at least one display for provision of the individual labels of the plurality of keys in response to user input.

The invention claimed is:

1. An Input device comprising:
   a plurality of keys comprising a first plurality of keys including a first key, a second key, and a third key, each of the plurality of keys having a depressible key cap with an at least semi-transparent top surface, each of the plurality of keys further having at least one communication member configured for communicating a depression of the corresponding key cap,
   at least one detection structure configured for detecting an individual depression of each of the plurality of key caps as communicated by at least one respective communication member of any of the plurality of keys, and
   at least one display comprising a first display forming a first sheet, the first display being arranged between the at least one detection structure and the key caps of the first plurality of keys, such that individual labels of the first plurality of keys are viewable via the at least semitransparent top surfaces of the respective key caps, the first display comprising a plurality of first electrodes and a plurality of second electrodes, the plurality of first electrodes being mutually parallel, the plurality of second electrodes being mutually parallel, the plurality of first electrodes intersecting the plurality of second electrodes, the first display being configured such that a pixel of the first display is provided with respective image information by addressing both a respective electrode of the plurality of first electrodes and a respective electrode of the plurality of second electrodes, that wherein each of the plurality of keys further comprising at least four guide members configured for guiding a depression of the key cap of the respective key of the plurality of keys, and wherein the at least four guide members include the at least one communication member of the corresponding key, and the first display being configured for providing image information of individual labels for each key of the first plurality of keys, and wherein at least one electrode of the plurality of first electrodes being configured for addressing a first pixel of a first label of the first key and a second pixel of a second label of the second key, at least one electrode of the plurality of second electrodes being configured for addressing the first pixel of the first label of the first key and a third pixel of a third label of the third key, and the first display comprising a plurality of through holes, the plurality of through holes enabling the plurality of respective guide members to be movable there through, and the plurality of through holes enabling the plurality of respective communication members to communicate physically there through to the at least one detection structure for detecting individual depression of each of the first plurality of key caps.

2. The input device according to claim 1, wherein the input device comprises a plurality of display interfaces configured to feed the at least one display with data for provision of the image information, the first plurality of display interfaces including a first display interface configured for feeding the first display via at least some of the plurality of first electrodes and a second display interface configured for feeding the first display via at least some of the plurality of second electrodes.

3. The input device according to claim 2, wherein the plurality of display interfaces includes a third display interface.

4. The input device according to claim 3, wherein the third display interface is configured for feeding the first display via at least some of the plurality of the first electrodes.

5. The input device according to claim 4, wherein the input device is configured such that the first display interface and the third display interface feed the plurality of the first electrodes with a common and concurrent data.

6. The input device according to claim 4, wherein the input device is configured such that a first part of the first electrodes are feed exclusive by the first display interface and a second part of the first electrodes are fed exclusive by the third display interface.

7. An apparatus with a processor that is connected to an input device according to claim 4, wherein the processor is configured for receiving input from the input device and being configured for controlling the at least one display for provision of the individual labels of the plurality of keys in response to user input.

8. The input device according claim 3, wherein the plurality of keys comprising a second plurality of keys including a first key, a second key, and a third key, the at least one display comprising a second display forming a second sheet, the second display being configured for providing image information of individual labels for each key of the second plurality of keys, the second display being arranged between the at least one detection structure and the key caps of the second plurality of keys, such that the individual labels of the second plurality of keys are viewable via the at least semi-transparent top surfaces of the respective key caps, the second display comprising a plurality of first electrodes and a plurality of second electrodes, the plurality of first electrodes intersecting the plurality of second electrodes, the second display being configured such that a pixel of the second display is provided with respective image information by addressing both a respective electrode of the plurality of first electrodes of the second display and a respective electrode of the plurality of second electrodes of the second display, at least one electrode of the plurality of first electrodes of the second display being configured for addressing a first pixel of a first label of the first key of the second plurality of keys and a second pixel of a second label of the second key of the second plurality of keys, at least one electrode of the plurality of second electrodes of the second display being configured for addressing the first pixel of the first label of the first key of the second plurality of keys and a third pixel of a third label of the third key of the second plurality of keys, the second display comprising a plurality of through holes, the plurality of through holes enabling the plurality of respective communication members to communicate physically there through to the at least one detection structure for detecting individual depression of each of the second plurality of key caps, the plurality of display interfaces including a fourth display interface, the third display interface being configured for feeding the second display via at least some of the plurality of first electrodes of the second display and the fourth display interface configured for feeding the second display via at least some of the plurality of second electrodes of the second display.

9. The input device according to claim 3, wherein the input device is configured such that each communication member of at least one of the plurality of keys are configured for communicating through individual through holes.

10. The input device according to claim 3, wherein each communication member comprises a rigid member being rigidly connected to the corresponding key cap.

11. The input device according to claim 3, wherein each key cap of the plurality of keys is rectangular and each of the plurality of keys comprises at least two guide members extending from corners of the rectangular key caps.

12. An apparatus with a processor that is connected to an input device according to claim 3, wherein the processor is configured for receiving input from the input device and being configured for controlling the at least one display for provision of the individual labels of the plurality of keys in response to user input.

13. The input device according to claim 2, wherein the input device is configured such that each communication member of at least one of the plurality of keys are configured for communicating through individual through holes.

14. The input device according to claim 2, wherein each communication member comprises a rigid member being rigidly connected to the corresponding key cap.

15. The input device according to claim 2, wherein each key cap of the plurality of keys is rectangular and each of the plurality of keys comprises at least two guide members extending from corners of the rectangular key caps.

16. An apparatus with a processor that is connected to an input device according to claim 2, wherein the processor is configured for receiving input from the input device and being configured for controlling the at least one display for provision of the individual labels of the plurality of keys in response to user input.

17. The input device according to claim 1, wherein the input device is configured such that each communication member of at least one of the plurality of keys are configured for communicating through individual through holes.

18. The input device according to claim 1, wherein each communication member comprises a rigid member being rigidly connected to the corresponding key cap.

19. The input device according to claim 1, wherein each key cap of the plurality of keys is rectangular and each of the plurality of keys comprises at least two guide members extending from corners of the rectangular key caps.

20. An apparatus with a processor that is connected to an input device according to claim 1, wherein the processor is configured for receiving input from the input device and being configured for controlling the at least one display for provision of the individual labels of the plurality of keys in response to user input.

* * * * *